(12) United States Patent
Tracey et al.

(10) Patent No.: US 11,971,893 B1
(45) Date of Patent: Apr. 30, 2024

(54) GROUP BY OPERATION ON TIME SERIES DATA USING COUNT-MIN SKETCH

(71) Applicant: Rapid7, Inc., Boston, MA (US)

(72) Inventors: David Christopher Tracey, Monasterboice (IE); Miguel Angel Casanova, Dubin (IE)

(73) Assignee: Rapid7, Inc., Boston, MA (US)

( * ) Notice: Subject to any disclaimer, the term of this patent is extended or adjusted under 35 U.S.C. 154(b) by 18 days.

(21) Appl. No.: 16/936,002

(22) Filed: Jul. 22, 2020

(51) Int. Cl.
G06F 16/9535 (2019.01)
G06F 16/23 (2019.01)
G06F 16/2455 (2019.01)
G06F 16/2458 (2019.01)
G06F 16/248 (2019.01)
G06F 16/28 (2019.01)
G06F 16/951 (2019.01)

(52) U.S. Cl.
CPC .... G06F 16/24556 (2019.01); G06F 16/2379 (2019.01); G06F 16/2477 (2019.01); G06F 16/248 (2019.01); G06F 16/287 (2019.01)

(58) Field of Classification Search
CPC ............ G06F 16/24556; G06F 16/248; G06F 16/2379; G06F 16/287; G06F 16/2477
See application file for complete search history.

(56) References Cited

U.S. PATENT DOCUMENTS

| | | | |
|---|---|---|---|
| 6,151,584 A | 11/2000 | Papierniak et al. | |
| 6,347,331 B1 | 2/2002 | Dutcher et al. | |
| 7,330,871 B2 | 2/2008 | Barber | |
| 7,363,299 B2 | 4/2008 | Dalvi et al. | |
| 8,145,669 B2 | 3/2012 | Cormode et al. | |
| 8,290,972 B1 | 10/2012 | Deshmukh et al. | |
| 8,307,099 B1 | 11/2012 | Khanna et al. | |
| 8,887,286 B2 | 11/2014 | Dupont et al. | |
| 9,578,046 B2 * | 2/2017 | Baker | H04L 63/1416 |
| 11,217,023 B1 * | 1/2022 | Alberico | G06F 3/0486 |
| 2003/0046442 A1 | 3/2003 | Maryka et al. | |
| 2004/0230989 A1 | 11/2004 | Macey et al. | |
| 2009/0164522 A1 | 6/2009 | Fahey | |

(Continued)

OTHER PUBLICATIONS

U.S. Appl. No. 16/936,013, filed Jul. 22, 2020, Miguel Angel Casanova.

*Primary Examiner* — Etienne P Leroux
*Assistant Examiner* — Oscar Wehovz
(74) *Attorney, Agent, or Firm* — Ashwin Anand; Lei Sun

(57) ABSTRACT

Systems and methods are disclosed to implement a bounded group by query system that computes approximate time-sliced statistics for groups of records in a dataset according to a group by query. In embodiments, a single pass scan of the dataset is performed to accumulate exact results for a maximum number of groups in a result grouping structure (RGS) and approximate results for additional groups in an approximate result grouping structure (ARGS). RGSs and ARGSs are accumulated by a set of accumulator nodes and provided to an aggregator node, which combines the received structures to generate exact or approximate statistical results for at least a subset of the groups in the dataset. Advantageously, the disclosed query system is able to produce approximate results for at least some of the groups in a single pass of the dataset using size-bounded data structures, without predetermining the actual number of groups in the dataset.

20 Claims, 19 Drawing Sheets

(56) References Cited

U.S. PATENT DOCUMENTS

| | | |
|---|---|---|
| 2010/0050169 A1 | 2/2010 | Dehaan |
| 2011/0277034 A1* | 11/2011 | Hanson ................. G06F 21/554 |
| | | 709/224 |
| 2015/0163104 A1* | 6/2015 | Coster ..................... H04L 43/02 |
| | | 709/224 |
| 2015/0341212 A1* | 11/2015 | Hsiao .................... G06F 3/0482 |
| | | 715/735 |
| 2016/0328432 A1* | 11/2016 | Raghunathan ...... G06F 16/2264 |
| 2017/0060769 A1 | 3/2017 | Wires et al. |
| 2017/0208077 A1* | 7/2017 | Freedman ............... H04L 41/20 |
| 2017/0364721 A1 | 12/2017 | Yeakley et al. |
| 2018/0075126 A1* | 3/2018 | Tamayo .................. G06F 16/26 |
| 2018/0322607 A1 | 11/2018 | Mellempudi et al. |
| 2018/0349931 A1 | 12/2018 | Chen et al. |
| 2019/0026351 A1* | 1/2019 | Maor ...................... G06F 16/26 |
| 2020/0334232 A1* | 10/2020 | Arye .................... G06F 16/215 |

\* cited by examiner

Configure Group By Query Execution *800*

Result Storage Group Limits: *810*

Maximum number of exact group results to store during accumulation phase: __10000__

Maximum number of individual group results to store during aggregation phase: __20000__

Time Slice Zooming Recommendations: *820*

☒ Zoom when time slice includes more than __2500__ approximate results

☒ Zoom when time slice includes more than __10000__ distinct groups keys in the "others" category ☒ Automatically execute zooming query on time slice(s):

☒ Increase number of time slices by a factor of __4__

☐ Increase accumulation phase group limit by a factor of ____

☐ Increase aggregation phase group limit by a factor of ____

GROUP BY OPERATION ON TIME SERIES DATA USING COUNT-MIN SKETCH

BACKGROUND

Many types of modern computer applications require statistical functions to be computed on time-based data. For example, some enterprise security management systems monitor a company's network to collect data about timestamped events in the network. These security management systems may implement various assessment processes to analyze captured event logs and provide query interfaces that allow users to search the event logs. In some situations, an event log search may require group statistics to be computed for different groupings of event records in the event log. For example, the event records may be grouped based on a group key (e.g. a particular attribute of the records) and according to their timestamps (e.g., into daily time slices).

In traditional database systems such as relational database systems, group by queries are performed by predetermining the number of groups in the dataset. The number of groups may be determined based on an initial scan of the data or other data objects. However, in the case of log data, the number of groups in the data may not be efficiently determinable prior to the query. An initial pass of the log data to determine distinct groups could be extremely time consuming. Not knowing the number of groups in the data prevents the query system from allocating size-bounded data structures to store results of the group by query. A large number of groups in the data can lead to unconstrained memory use during query execution and cause some queries to fail altogether.

SUMMARY OF EMBODIMENTS

The systems and methods as described herein may be employed in various combinations and in embodiments to implement a bounded group by query system that computes approximate time-sliced statistics for groups of records in a dataset specified by a group by query. In some embodiments, a single pass scan of the dataset is performed to accumulate exact results for a maximum number of groups in a result grouping structure (RGS) and approximate results for additional groups in an approximate result grouping structure (ARGS). In some embodiments, query execution is distributed across a set of accumulator nodes that are assigned to different portions of the dataset. The RGSs and ARGSs produced by the accumulator nodes are provided to an aggregator node, which merges the received structures to generate exact or approximate statistical results for at least a subset of the groups in the dataset. Advantageously, the disclosed query system is able to produce approximate results for at least some of the groups in each time slice in a single pass of the dataset using size-bounded data structures. The approximate results allow the user to gain a rough idea of what groups are in the data and issue further queries to get more exact results in narrower time ranges. The result data structures generated by the system can be easily combined to support distributed query execution across multiple nodes. Additionally, the disclosed techniques can be extended to queries with multi-layered group by operations that group records based on multiple group keys.

BRIEF DESCRIPTION OF THE DRAWINGS

FIG. 8 depicts a configuration GUI that allows users to configure the execution of group by queries in a bounded group by query system, according to some embodiments.

Figure 1:
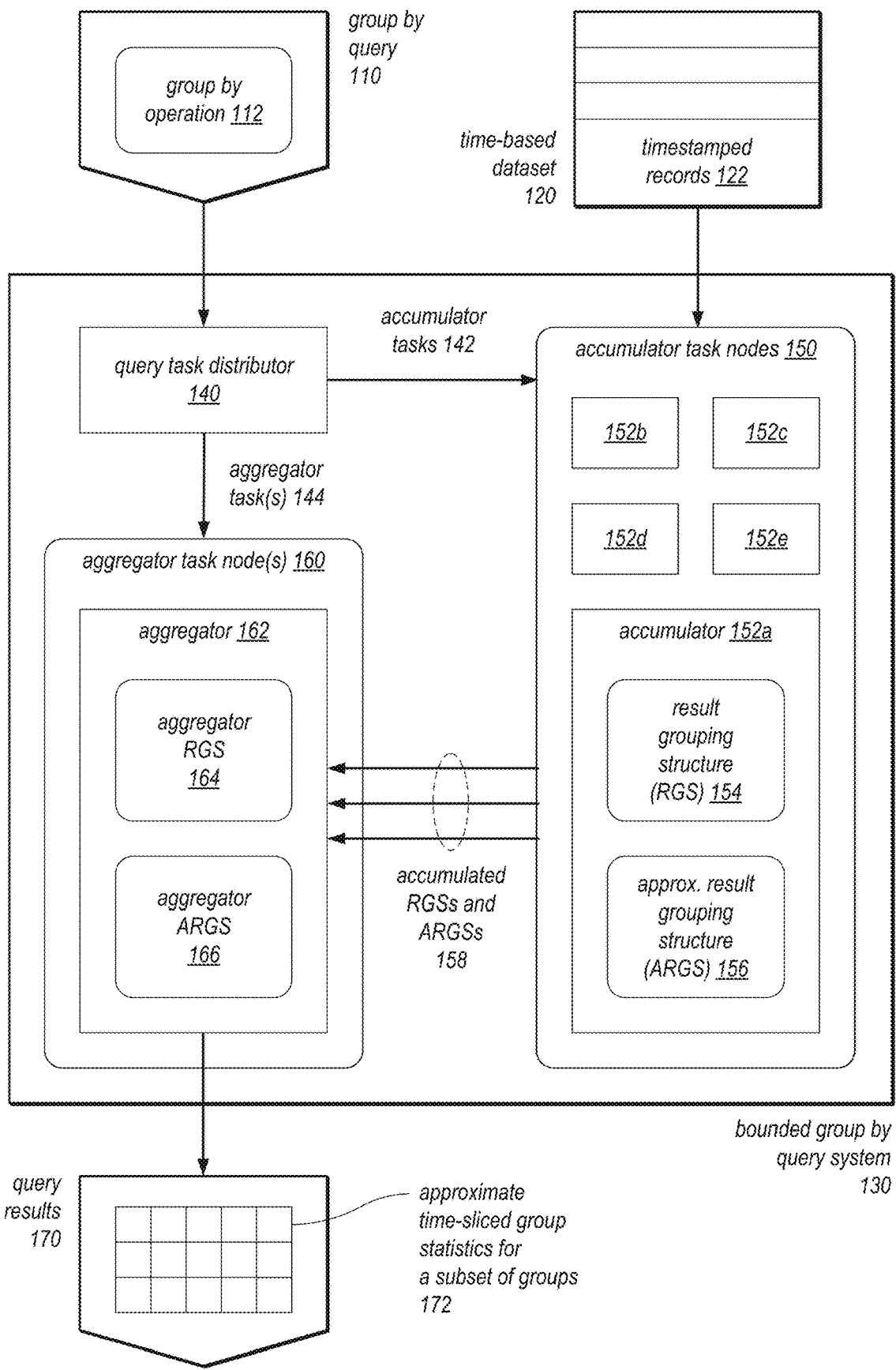
FIG. 1 is a block diagram illustrating a bounded group by query system that generates approximate time-sliced group statistics for group by queries, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Modern enterprise security management systems provide capabilities to monitor a company's network by collecting different types of event data from computing resources in the network. Event data may be stored in logs as timestamped log records, though not necessarily in a time-sequenced order. The enterprise security management system may implement a variety of processes to examine these logs to detect conditions such as network attacks, or compliance violations, or security vulnerabilities. In some embodiments, the enterprise security management system may provide user interfaces that allow users to perform queries to search the event logs.

The searching and analysis of event logs in this context commonly involve computing a statistical function on groups of log records having a common value for a group key. For example, a log query may specify to group log records by a network address attribute, and compute a statistic (e.g. a total amount of uptime) for each network address. The query may specify that the group statistical results should be computed in individual time slices (e.g. the total uptime for each day).

In traditional database systems such as relational database systems, these types of group by queries are performed by predetermining the number of groups in the dataset. The number of groups is needed to allocate result data structures during execution of the query. Depending on the system, the number of groups may be determined based on an initial scan of the data or using other maintained data objects. However, in the case of log data, it may not be possible to efficiently predetermine the number of groups. There are no data objects that maintain this type of information. Due to the amount of logged data, an initial pass of the log data to determine distinct groups can be extremely time consuming. Not knowing the number of groups in the data prevents the query engine from allocating size-bounded data structures during query execution. As a result, a large number of groups in the data can lead to unconstrained memory use during query execution and cause some queries to fail altogether.

To address these and other problems of existing data query system, embodiments of a bounded group by query system are disclosed herein capable of computing time-sliced statistics for groups of records specified by a group by query without first determining the number of groups. In some embodiments, execution of the group by query is distributed across a set of accumulator nodes that are assigned to different portions of the dataset. Each accumulator node performs a single pass scan of its portion of the dataset to accumulate exact group results for up to a maximum number of groups in a result grouping structure (RGS), and approximate group results for additional groups in an approximate result grouping structure (ARGS). The RGSs and ARGSs compiled by the accumulator nodes are provided to an aggregator node, which combines the received result grouping structures into its own aggregator RGS and ARGS. The results of the group by query are generated from the aggregator RGS and ARGS, where individual group statistics are provided for groups in the aggregator RGS, and a collective group statistic is provided for groups in the aggregator ARGS. All group statistics are provided for the time slices specified by the query.

Advantageously, the disclosed query system is able to execute a group by query in a single pass of the dataset and without having to sort the dataset in any particular order. The query can be performed using size-bounded data structures that do not require additional memory during query execution. The query results may include approximate results for at least some of the groups for each time slice if the maximum allowed number of groups is exceeded. The approximate results returned by the query system will provide the user a rough idea of what groups are in each time slice, which will guide the user to issue further queries for more exact group results in narrower time ranges. In some embodiments, the bounded group by query system may automatically provide a recommendation to zoom in on a particular time slice whose results are particularly imprecise (e.g., where the time slice indicates a large number of approximate group results). The result data structures generated by the system can be easily used to support distributed query execution across multiple nodes, and easily extended to queries specifying multiple group by operations.

In some embodiments, the approximate result grouping structure used by the bounded group by query system is a time-sliced approximate data structure (TSADS) that comprises two matrices. The first matrix is a counts matrix that counts the number of datapoints or records in each group and each time slice. In some embodiments, the counts matrix is an extension of a count-min sketch data structure that adds a time dimension for storing group statistical results in time series form. Group statistical results are assigned to cells in the counts matrix by hashing the group key using a set of hash functions. In some embodiments, the counts matrix may be a three-dimensional matrix where the first dimension corresponds to the set of hash functions used to hash the group key, the second dimension corresponds to a set of buckets in the hash space of the hash functions, and the third dimension corresponds to the time slices. In some embodiments, the second matrix is a statistics matrix that stores statistical results of the groups in each time slice. Cells in the statistics matrix have a one-to-one correspondence with cells in the counts matrix based on their relative positions in the two matrices. In some embodiments, the TSADS is defined as a class in an object-oriented programming language with associated functions to access and manipulate the two matrices.

In some embodiments, when a new timestamped datapoint is added to the TSADS, the counts matrix is first updated to increment a set of approximate counts of the group and the time slice to which the datapoint belongs. The updated cells in the counts matrix are used to look up corresponding cells in the statistics matrix. The corresponding cells are then updated based on the statistical function being applied. In some embodiments, the TSADS structure can be used to store results for a number of different group statistical functions, and the statistical functions can be determined at runtime.

In some embodiments, the TSADS may provide a function to retrieve a time series of approximate statistical results of a particular group. To retrieve the approximate statistical result in a time slice, the set of all approximate counts for the group in the time slice are identified from the counts matrix, and a best approximate count is determined from the identified approximate counts. The cell storing the best approximate count is used to look up a corresponding cell in the statistics matrix, and the value of that corresponding cell is used as the best approximate statistic for the group in that time slice. The results of the retrieve function will include the group's best approximate statistics and approximate counts for each time slice in the TSADS.

In some embodiments, one TSADS can be combined into another TSADS to produce a resulting TSADS that reflects the approximate counts and group statistics of both original TSADSs. If there are overlapping cells in the counts matrices of the two TSADSs, their approximate counts are added together. Overlapping cells in the statistics matrices may be combined based on the statistical function and corresponding approximate count values from the counts matrices. In some embodiments, the combine operation may be used to by the aggregator node of the bounded group by query system to aggregate the accumulator ARGSs generated by the accumulator nodes into an aggregator ARGS maintained by the aggregator node.

Advantageously, the time-sliced approximate data structure is a size-bounded data structure that can be used to store approximate datapoint counts and statistics for an unbounded number of groups. Accordingly, it can be used to store group statistics in situations where the number of groups is not known in advance. The TSADS natively organizes the data into distinct time slices and allows the data to be easily returned in time series form. In addition, the TSADS is agnostic as to the type of statistical value being stored, and can be used to store results for different types of group statistical functions. In some embodiments, the TSADS is defined as an extensible class, so that the list of supported statistical functions can be augmented with no changes to the class.

As may be appreciated by those skilled in the art, embodiments of the bounded group by query system as described herein provides many technical advantages over existing data query systems of the state of the art, to improve upon the functioning of these existing systems. These and other features and benefits of the bounded group by query system are described in detail below, in connection with the figures.

FIG. 1 is a block diagram illustrating a bounded group by query system that generates approximate time-sliced group statistics for group by queries, according to some embodiments.

As shown, the depicted bounded group by query system 130 is configured to accept a group by query 110 as input and output query results 170. The query 110 may be directed to a time-based dataset 120, which includes timestamped records 122. In some embodiments, the time-based dataset 120 may include log records of events, where each record includes a timestamp for an event. However, the timestamped records 122 may not necessarily be stored in a time-sequenced order. Each record may include a set attributes (e.g. attributes about the events), including numerical attributes used to compute statistical functions. In some embodiments, the dataset 120 is distributed over many different locations (e.g. different servers, networks, repositories, or geographic locations, etc.).

As shown, the group by query 110 includes a group by operation 112. The group by operation specifies to group records in the dataset 120 into groups and compute a group statistical function for each group. Additionally, the query 110 may specify that query results 170 should be returned in a time series of ordered time slices. For example, the group by query may specify to group the records 122 according to a group key attribute (e.g. a status code attribute), and calculate a group statistic for each determined group (e.g. a total count of each status code on a daily basis).

Depending on the embodiment, the query 110 may be received in a variety of forms. For example, the query may be specified in a query language such as Structured Query Language (SQL) or in some other specialized query language to search log data. The query may be received via a user interface (e.g. a command line or graphical user interface (GUI)), or a programmatic interface (e.g. an application programming interface (API) or a web service interface). In some embodiments, the query system 130 may be implemented as a web service, and provide a querying interface configured to receive queries 110 and produce query results 170 as objects formatted in the Javascript Object Notation (JSON) format.

In some embodiments, the query system 130 may be implemented as a distributed query execution system. The distributed query execution system may implement a query task distributor component 140 that divides the query 110 into individual query tasks and distribute the task to multiple nodes to be executed in parallel. As shown in this example, the query system 130 is implemented using a connected network of compute nodes 150 and 160. Embodiments of the distributed query execution system are disclosed in co-pending U.S. patent application Ser. No. 16/798,222 entitled "Programmable framework for Distributed Computation of Statistical Functions over Time-Based Data," which is incorporated by reference herein in its entirety.

In some embodiments, the query task distributor 140 may implement a task splitter component and a task assignor component. The task splitter may be configured to split the execution of the query into a number of accumulator tasks 142 and aggregator task(s) 144. In some embodiments, the accumulator tasks 142 are configured to read portions of the time-based dataset 120 and produce individual results structures 158. In some embodiments, the aggregator task(s) 144 are configured to receive and aggregate the result structures 158 produced by the accumulator tasks to generate the query results 170.

In some embodiments, the splitting of tasks 142 and 144 may be performed according to configuration rules or policies provided by a user or administrator of the system via a configuration interface. The task splitting may be performed based on runtime conditions such as the size of the dataset 120, the number of different portions (e.g. files, volumes, repositories, or other divisible portions) of the dataset, the number of different locations of the dataset, the specified time range of the query 110, the number of time slices specified by the query, and the number and operating conditions of available task nodes 150 and 160 for performing the tasks.

In some embodiments, the tasks 142 and 144 will be assigned to different worker nodes 150 and 160. The task nodes 150 and 160 may be individual compute nodes, virtual machines instances, or container instances managed by the system 130. As with the task splitting process, the task assignment may be performed according to set of configuration rules or policies. Task assignment may depend on a number of factors. For example, a task that accesses a particular portion of the dataset may be assigned to a task node that has local access to that portion to avoid having to transmit data in the portion over the network. As another example, multiple tasks that require access to a common portion of the dataset may be assigned to the same task node, so as to allow that node to optimize the reading of the portion by these tasks (e.g. by allow the multiple tasks to share a common cache or file lock). As another example, a task node that has been assigned a group of related accumulator tasks may also be assigned an aggregator task dedicated to the group, so that it can collect all of the statistical result structures produced by the group locally on that node, thereby reducing inter-node network traffic. As yet another example, task nodes may be selected for particular tasks based on their capabilities (e.g. memory size, processing power, network bandwidth) and their current load or usage level. A node that is relatively free may be preferred over a node that is under heavy load or currently executing another task with a higher priority.

As shown in this example, the task nodes in this example are split into two groups: the accumulator task nodes 150 and the aggregator task nodes 160. In some embodiments, the two sets of task nodes 150 and 160 may be drawn from the same set of nodes. In some embodiments, there may be multiple sets of task nodes that are distributed across different locations, for example, different networks, data centers, or geographic locations. The task nodes 150 and 160 may be maintained in one or more node pools that can be reused to execute query tasks for different queries. In some embodiments, membership in the node pool may be managed by the query system 130, so that problematic or malfunctioning nodes are removed or restarted, and new nodes are added to the pool as demand for statistical function tasks increases.

In some embodiments, each of the task nodes 152a-e or 162a-e may be capable of executing multiple accumulator or aggregator tasks. Each accumulator or aggregator task may be executed as an individual process or thread on a task node 152 or 162. The task processes or threads may also be maintained in a process or thread pool and reused for different tasks. Process or thread pools allow processes or threads to be recruited immediately for new query tasks, and avoids the heavy costs of initiating new processes or threads for the new tasks.

Each accumulator node 152 will execute an individual accumulator task to produce a pair of group result grouping structures for its assigned portion of the dataset 120. As shown, accumulator node 152a has constructed in memory a result grouping structure (RGS) 154 and an approximate result grouping structure (ARGS) 156. The RGS is used to hold group statistics of individual groups for up to a maximum number of groups. For example, the RGS may be configured to store group results for the first 100 groups encountered in the dataset portion assigned to the accumulator 152a. In some embodiments, the RGS may be implemented as a group map structure that maps a limited number of group keys to their accumulated statistical values. Results of additional groups above the maximum are stored in the ARGS. In some embodiments, the ARGS may be implemented using a time-sliced approximate data structure (TSADS), which may include a space-bounded probabilistic data structure such as a count-min sketch. The TSADS is capable of storing statistical results for an unbounded number of groups. However, group results added to the TSADS must be treated as approximates, as the TSADS does not guarantee the return of exact results. Embodiments of the TSADS are discussed in further detail in connection with FIGS. 4A to 4E.

As shown, the RGSs and ARGSs 158 accumulated by the accumulator nodes are provided or transmitted to the one or more aggregator node(s) 162. In some embodiments, the accumulated structures 158 may be sent to the aggregator node asynchronously as each accumulator task is completed. The aggregator node 162 is configured to combine or merge the received structures 158 into its own result grouping structures, including an aggregator RGS 164 and an aggregator ARGS 166 shown in this example. In some embodiments, the aggregator RGS 164 may be the same data structure as the RGS 154, and the aggregator ARGS 166 may be the same data structure as the ARGS 156. The aggregator RGS 164 will be used to aggregate individual group statistics for up to another maximum number of groups in the dataset. Statistics for groups above the second maximum number will be aggregated in the aggregator ARGS 166. In some embodiments, the group statistics stored in the aggregator RGS 164 may include a mix of exact and approximate results. In some embodiments, the accumulator RGS 154 and the aggregator RGS 164 may be configured to store the same maximum number of groups. In some embodiments, the aggregator RGS maximum may be greater than the accumulator RGS maximum.

In some embodiments, the aggregator 162 will generate the query results 170 from the contents of the aggregator RGS 164 and the aggregator ARGS 166. The query results may include a time series of individual group statistics for a subset of the groups in the dataset 120. The subset of groups may correspond to the groups in the aggregator RGS 164. As noted, in some cases, some of the group results in the aggregator RGS (and thus the query result 170) may be approximate. The query result 170 may indicate to the caller whether each group result is exact or approximate. Additionally, in some embodiments, the query results may include a time series of collective group statistics for all groups in the aggregator ARGS 166. The query results 170 will thus provide an approximate picture of the group statistics in each time slice, without necessarily providing exact results for all groups in each time slice. However, the query result can be generated very quickly in a single pass of the dataset without having to sort the dataset, and using space-bounded data structures that do not grow with the number of groups in the dataset.

Figure 2:
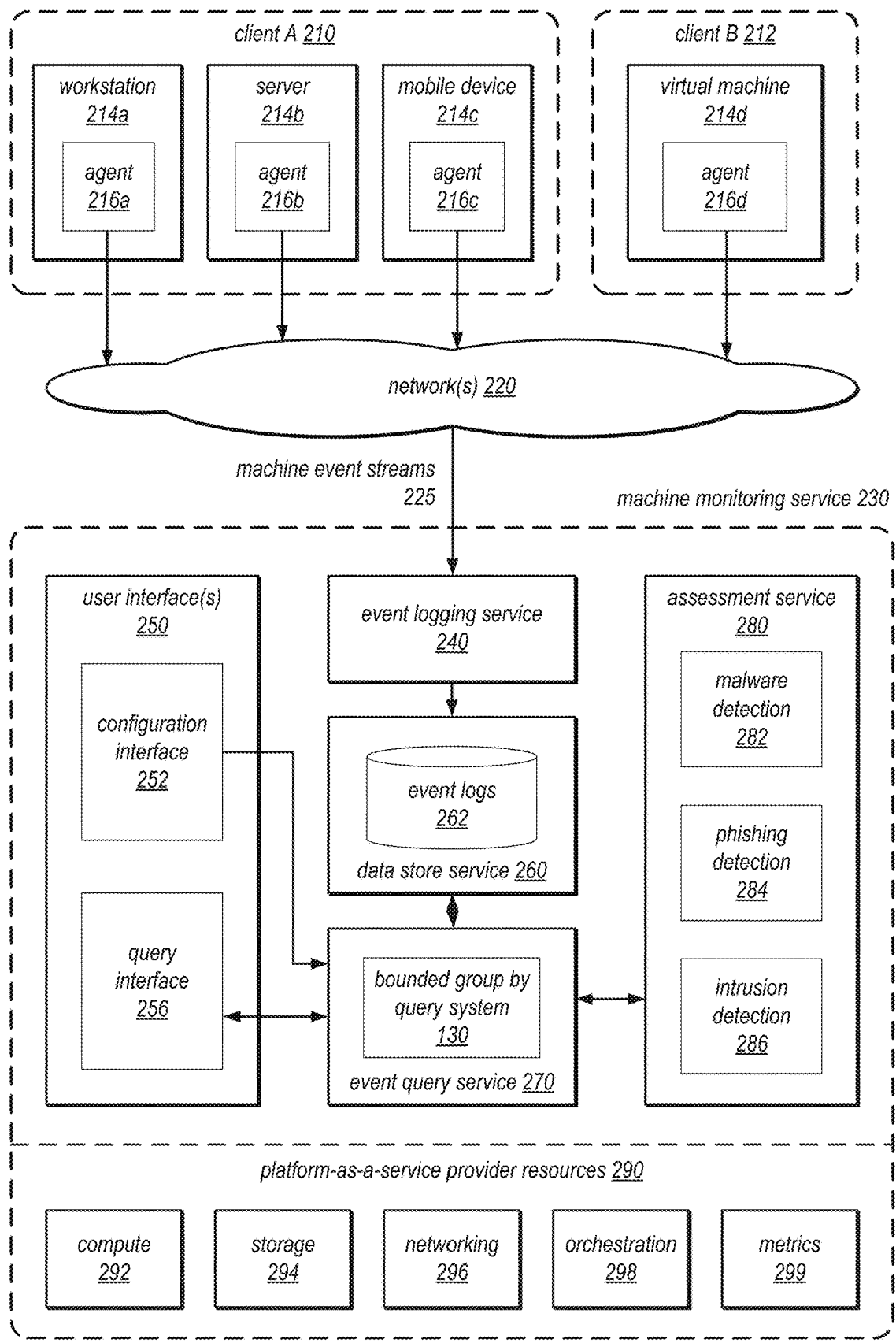
FIG. 2 is a block diagram illustrating a machine monitoring service implemented in a platform-as-a-service provider network that implements a bounded group by query system for machine event data, according to some embodiments.

FIG. 2 is a block diagram illustrating a machine monitoring service implemented in a platform-as-a-service provider network that implements a bounded group by query system for machine event data, according to some embodiments.

As shown in FIG. 2, an instance of the bounded group by query system 130 of FIG. 1 is implemented in a machine monitoring service 230. In some embodiments, the machine monitoring service 230 may be a service implemented in the cloud and on a platform-as-a-service (PaaS) provider network. The machine monitoring service 230 may be configured to communicate with many agents 216a-d deployed on remote machines 214a-d over one or more networks 220. In some embodiments, the agents may be configured to collect or generate machine events 225 about the remote machines, and transmit the machine events to the machine monitoring service 230. The machine monitoring service 230 may receive machine events from many different clients (e.g. different entities, companies, organizations, groups, geographic locations, networks, etc.), and perform remote monitoring of the computing resources of these different clients. In some embodiments, distinct clients 210 and 212 may be associated with different user accounts of the machine monitoring service 230.

As shown, the clients in this example may operate different types of computing resources, such as a workstation 214a, a server 214b, a mobile device 214c, and a virtual machine 214d. The virtual machine 214d may be an instance of a computer and operating system that is emulated and hosted on a physical virtual machine host. The virtual machine host may implement virtualization hardware and/or software (e.g. a hypervisor) to execute and manage multiple instances of guest operating systems. Example implementations of such virtualization technologies include VMWARE ESX/ESXI, MICROSOFT HYPERV, AMAZON WEB SERVICES, and MICROSOFT AZURE. Another type of virtualized execution environment may be a hosted container, which provides a portable and isolated execution environment over a host operating system of a physical host. Examples of container hosting technologies include DOCKER, GOOGLE KUBERNETES, AMAZON WEB SERVICES, and MICROSOFT AZURE. Depending on the embodiment, the agents 216 may be deployed on other types of computing systems, including embedded systems, networking devices, storage devices, Internet-of-Things (IoT) devices, vehicles, and the like.

In various embodiments, the network 220 may encompass any suitable combination of networking hardware and protocols necessary to enable communications between the agents 216 and the machine monitoring service 230. In some embodiments, the remote machines 214 may execute in a private network of a company, behind a company firewall, and the network 220 may include a public network such as the Internet, which lies outside the firewall. The network 220 may encompass the different telecommunications networks and service providers that collectively implement the Internet. In some embodiments, the network 220 may also include private networks such as private local area networks (LANs), private wide area networks (WANs), or private wireless networks. The network 220 may be implemented using different hardware (e.g., modems, routers, switches, load balancers, proxy servers, etc.) and software (e.g., protocol stacks, routing software, firewall/security software, etc.) for establishing networking links between the remote machines 214 and the machine monitoring service 230. In some embodiments, the agents 216 may transmit the machine events 225 to the machine monitoring service 230 over the network 220 using secure communication channels such as transport layer security (TLS) connections implemented over the network 220.

As shown in this example, the machine monitoring service 230 is implemented using a number of constituent services 240, 250, 260, 270, and 280 implemented within a PaaS service provider network. The agents 216 and other clients of the machine monitoring service 230 may convey services requests to and receive responses from these services. In some embodiments, the service request and responses may be defined as part of RESTful API (e.g. one or more web services). The requests and responses may be formatted as JSON documents. In some embodiments, the machine assessment service 230 may implement service interfaces using other types of remote procedure calling protocols, such as GOOGLE PROTOCOL BUFFERS. The PaaS provider network may provide the hardware and/or software needed to implement service endpoints for these services, such that a request directed to a service is properly received by the endpoints.

As shown, the PaaS provider network may provide different types of computing resources 290, which can be leased by service customers to implement custom hosted services. As shown, the PaaS provider may provide resource services such as compute resource service 292, storage resource service 294, networking resources service 296, orchestration service 298, and resource metrics service 299. The services of the machine monitoring service 230 may be built using these underlying resource services provided by the PaaS provider. In some embodiments, the PaaS resources 290 may implement features such as load balancing of incoming service requests and/or dynamic management and scaling of service node pools. In some embodiments, each of the services 240, 250, 260, 270, and 280 may be implemented using a pool of service nodes provided by the PaaS provider, which may be individual instances of virtual machines. In some embodiments, the PaaS provider may be a provider such as AMAZON WEB SERVICES or MICROSOFT AZURE.

In some embodiments, the machine monitoring service 230 may be configured to monitor, analyze, and take action on security-related incidents that are detected on the remote machines 214 or entire remote company networks. As shown in this example, an event logging service 240 is provided to receive machine event streams 225 from the remote machines. The event logging service 240 may log the received events into one or more event logs 262, along with the events' individual timestamps. The query results produced by the query system 130 will be time sliced based on these timestamps. As shown, the event logs 262 may be stored by a data storage service 260, which may be provided by or implemented using the resources 290 of the PaaS network. The event logs may be stored in one or more databases or as files in one or more file systems. In some embodiments, the event logs may be stored in separate files or data stores, which may be distributed across multiple geographic locations.

In some embodiments, the machine monitoring service 230 may allow users or clients to view, analyze, and receive alerts and/or reports about the logged event data. For example, the service may allow users to run queries about the collected events for their machines using a query interface 256. The query interface 256 may be configured to submit queries to an event query service 270 that is configured to answer queries directed to the event log data stores. As shown, the query system 130 of FIG. 1 may be implemented as part of this event query service 270. In some embodiments, the event query service 270 may implement an existing query engine (e.g. a SQL query engine), and the query system 130 may be added as an adjunct component on top of the existing query engine. In some embodiments, the task nodes 150 and 160 of FIG. 1 may be provided by the underlying PaaS provider network, as pools of managed virtual machine instances. In some embodiments, communication mechanisms between the components of the query system 130 (e.g. message queues) may be implemented using orchestration components provided by the PaaS network.

As shown, in some embodiments, the event query service 270 may be used by various assessment services 280 to perform automated machine assessment processes. The various components of the assessment service 280 may perform ad hoc queries on the event logs via a service interface or API to examine the logged event data for a variety of purposes. For example, the malware detection module 282 may examine the machine event logs to detect the installation of a particular type of malware executable. As another example, a phishing detection module 284 may examine the email event logs to detect phishing attacks using new or unusual email addresses, web addresses, or email content. As yet another example, an intrusion detection module 286 may examine the event logs to detect suspicious communication patterns or attacker packet signatures. In some embodiments, these conditions may cause the assessment service 280 to generate alerts or notifications, or perform mitigation actions.

As shown, the machine monitoring service 230 may implement a set of user interfaces 250, which may be implemented as GUIs or web interfaces viewable using a web browser. In some embodiments, these user interfaces 250 may be implemented by client-side applications. As shown, the user interfaces may include a query interface 256 to allow users to submit group by queries to the event query service that specify group by operations (e.g. group by operation 112 of FIG. 1). The group by queries may be submitted in a query language or via a GUI. In some embodiments, responses to a query may be provided as graphical objects (e.g. a visual graph showing the time-sliced group statistical results 172).

In some embodiments, the user interfaces 250 may also implement a configuration interface 252. The configuration interface 252 may be used to configure various aspects of the machine monitoring service 230, including aspects of the query system 130. For example, the configuration interface 252 may be used to specify the maximum number of group statistics that are stored in the RGS structures used by the accumulator and aggregator nodes. In some embodiments, some such control parameters may be embedded in the query itself (e.g. as an optimization hint to the system to indicate how a group by operation should be performed).

Figure 3:
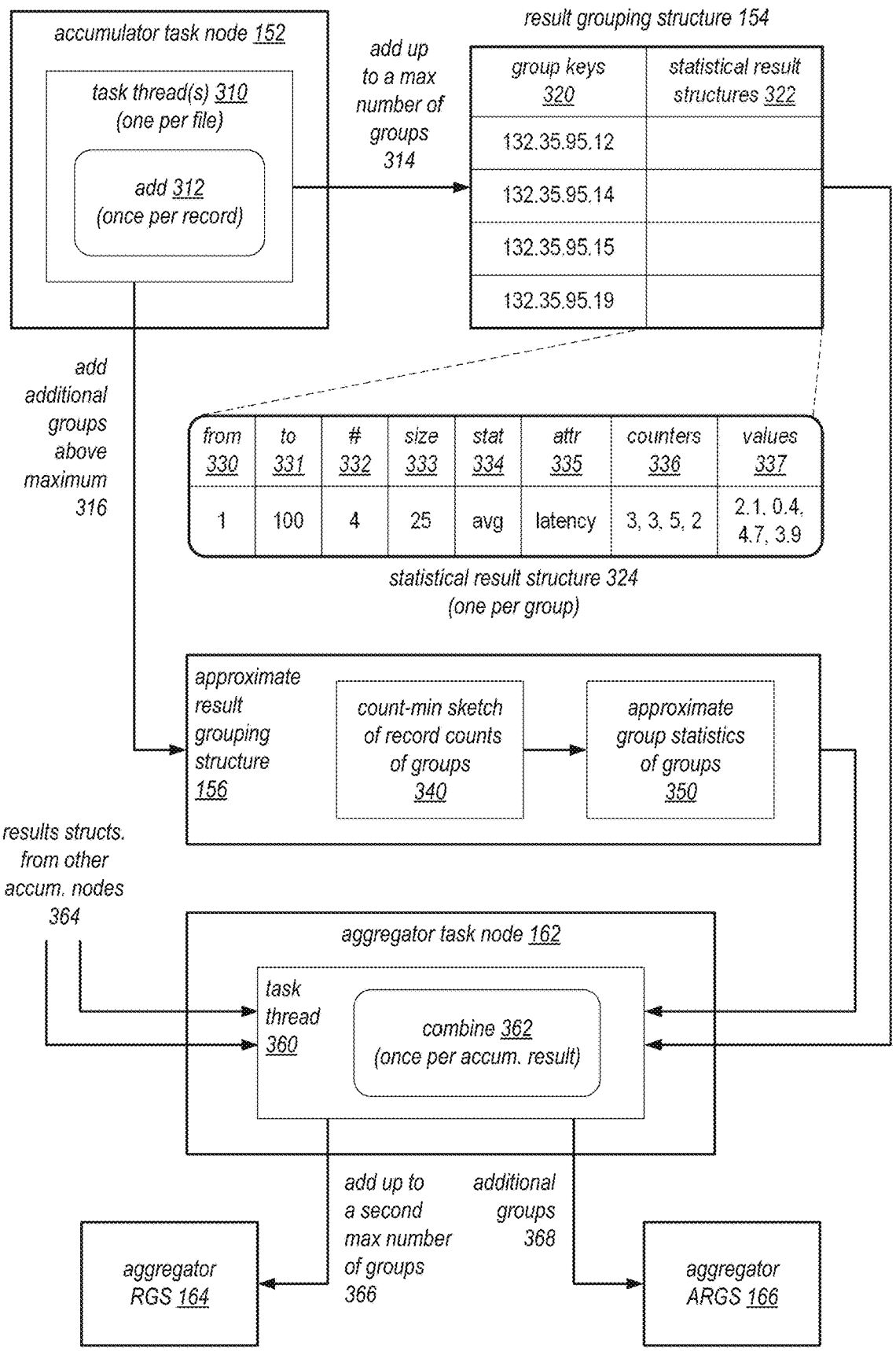
FIG. 3 illustrates example operations and data structures implemented by an accumulator node and an aggregator node in a bounded group by query system, according to some embodiments.

FIG. 3 illustrates example operations and data structures implemented by an accumulator node and an aggregator node in a bounded group by query system, according to some embodiments.

As shown in the figure, an accumulator task node 152 is executing a number of task threads 310. In some embodiments, each query task may be executed as a separate thread. As shown in this example, each task thread has been assigned a file. In some embodiments, the time-based dataset may be stored as multiple of files (e.g. log files) that are locally accessible from the individual task nodes (e.g. stored on storage devices locally accessible to the nodes). In some embodiments, to reduce data traffic over the network, a task that accesses a particular file is assigned to a node that has local access to that file. In some embodiments, the files may reside in a particular local area network, and only task nodes in that local area network are assigned tasks that access those files.

As shown, the task thread implements an add operation 312 to add individual records to data structures maintained by the accumulator task node. In some embodiments, the add operation 312 may be implemented as a library function that can be used by future developers to create newer custom tasks. The add operation may consume individual records or datapoints from the log file and add each record or datapoint into either the RGS 154 or the ARGS 156 used to accumulate group results for the group by operation. As shown, if the RGS 154 is not full (e.g. it has not yet stored group results for a maximum number of groups), the add operation will add 314 results for new groups to the RGS. However, if the RGS is full (e.g. it is storing group results for a maximum number of groups), the add operation will add 316 results for additional groups to the ARGS 156. Accordingly, for some group by queries that involve a large number of distinct groups larger than the maximum number, the group results for some of the groups will be stored as approximate values in the ARGS.

In some embodiments, the RGS 154 may be implemented as a group map that maps individual groups keys 320 to respective statistical result structures 322 for corresponding groups. As shown in this example, the group keys 320 indicate different values of a network address attribute of the log records.

In some embodiments, the RGS may store statistical result structure (e.g. structure 324) for each group key. The statistical result structure may indicate a number of data fields 330-337 for a particular group being accumulated by the task thread. Embodiments of the statistical result structure are discussed in co-pending U.S. patent application Ser. No. 16/798,222. As shown in this example, statistical result structure 324 indicates time slice information (330-333) for the time range assigned to the accumulator task (four slices of 25 time interval each, from intervals 1 to 100).

Additionally, the statistical result structure 324 indicates the record attribute 335 that is to be summarized for the group by query (here the "latency" attribute), and the statistical or summary function 334 that is to be applied to the record attribute (here the average). The statistical result structure 324 may be used to hold results for many different types of statistical or summary functions, including the count of datapoints in a group, the maximum of datapoint values in the group, the minimum of datapoint values in the group, the average of datapoint values in the group, the total (or sum) of datapoint values in the group, the maximum size of datapoints (e.g. the byte-size of the records) in the group, the minimum size of datapoints in the group, the average size of datapoints in the group, and the total size of datapoints in the group, among other types of statistics. In some embodiments, the type of the statistical or summary function is not hardcoded into the add operation 312, and may be dynamically determined by the bounded group by query system at runtime.

As shown, the statistical result structure 324 in this example also indicates a series of counters 336 that reflects the current record counts for the four time slices, and also a series of values 337 that reflects the current values of the group statistics computed for the four time slices (here the average of the "latency" attribute). With each new record processed that for this particular group key, the add operation 312 will update the counters 336 and values 337 fields to incorporate the new record into the group results for that group key.

As shown, the ARGS 156 in this example includes a count-min sketch 340 storing datapoint or record counts of individual groups, and a data structure 350 storing the approximate group statistics of the individual groups. As may be understood by those skilled in the art, a count-min sketch is a type of probabilistic data structure that can be used to store an approximate frequency table for data records. The count-min sketch uses a number of hash functions to hash records into a limited number of hash buckets. Because of the possibility of hash collisions, this method of counting may overcount some records. However, the chances of this error can be controlled by adjusting the number of hash functions or hash buckets. One benefit of the count-min sketch is that it is a structure of bounded size that can be used to hold approximate counts for an unbounded number of records. In this example, the count-min sketch 340 is used to store approximate counts of datapoints in each additional group that cannot be stored in the RGS 154 as they exceed the allowed size for storing exact data in RGS 154. In some embodiments, the count-min sketch 340 may be a three-dimensional matrix that stores approximate counts for a sequence of time slices as the third dimension.

In some embodiments, the approximate group statistics structure 350 may be a matrix that has the same dimensions as count-min sketch 340. Individual cells in the count-min sketch 340 may be mapped to corresponding cells in the approximate statistics matrix 350, so that the count-min sketch can be used as a lookup structure to retrieve statistical values from the statistics matrix. In some embodiments, the count-min sketch 340 and approximate group statistics data structure 350 may actually be implemented as a single matrix, where each cell in the single matrix includes both the approximate record count and the approximate statistical result for the group.

In some embodiments, when a new record is added to the ARGS, the ARGS will update a set of cells in the count-min sketch based on the group key of the new record. Each of the cells will be updated to indicate new approximate counts for that group. Then, corresponding cells in the statistics matrix 350 will also be updated by applying the specified statistical function to indicate new group statistical results for the group. As may be appreciated, some of the values in the statistics matrix 350 may be approximate values due to hash collisions in the count-min sketch 340.

In some embodiments, when an approximate group result is retrieved from the ARGS, the group key of the group is used to look up all approximate counts for the group in the count-min sketch 340. A best approximate count for the group is determined from the approximate counts. For example, the minimum of all approximate counts can be used as the best approximate count. The cell associated with the best approximate count is used to look up the corresponding cell in the approximate group statistics data structure 350, and the statistical result in that corresponding cell is returned as the best approximate group result. Because of the one-to-one correspondence between cells in the count-min sketch and the approximate group statistics data structure, the returned group result will have the same probability of error as the count-min sketch, which is dictated by the size of the count-min sketch.

As shown, the RGS 154 and ARGS 156 produced by the accumulators are provided to the aggregator task node 162, which executes another task thread 360 to perform the aggregator task on all result structures 364 received from the accumulator nodes. In some embodiments, the accumulator nodes may send the result structures directly to the aggregator task. In other embodiments, the RGS and ARGS structures may be sent to the aggregator task indirectly, via a coordinating component such as the query task distributor 140 or a result queue. The aggregator node is configured to aggregate the RGS and ARGS structures produced by the accumulator nodes into an aggregator RGS 164 and an aggregator ARGS 166, as shown. The two aggregator data structures may be used to store the final results of the group by operation.

In some embodiments, the aggregator task thread 360 may implement a combine operation 362 to build the aggregator RGS 164 and aggregator ARGS 166. Like the add operation 312, the combine operation 362 may be implemented as a library function. The combine operation may support many different types of statistical functions, which may be dynamically determined by the bounded group by query system at runtime.

As shown, the combine operation 362 may add 366 group results from the accumulator result structures into the aggregator RGS 164, for up to a second maximum number of groups. When the second maximum number is exceeded, the combine operation 362 will add 368 results for additional groups to the aggregator ARGS 166. In some embodiments, the maximum number of groups to be stored by the aggregator RGS may be the same maximum for the accumulator RGS. In some embodiments, the maximum capacity of the aggregator RGS may be larger than the accumulator RGS.

As may be appreciated, individual accumulator nodes may provide RGSs with different sets of groups, depending on which groups were first encountered during each accumulator task. For example, the particular group may be included in the RGS produced by a first accumulator node, but in the ARGS produced by a second accumulator node. If this group makes it into the aggregator's RGS 164, the statistical result of the group will be marked as an approximate value, because it will be computed based a combination of the group results in the RGS from the first accumulator node and the approximate results in the ARGS of the second accumulator node. A more detailed discussion of the combining process is provided below in connection with FIGS. 6A to 6E.

In some embodiments, after all accumulator result structures have been combined into the two aggregator result grouping structures 164 and 166, the results of the group by query will be generated from the two aggregator structures.

In some embodiments, the query result will include individual group results for every group in the aggregator RGS 164. As discussed, the group results may be provided as a time series of ordered time slices, so that one group result will be provided for each time slice specified by the query. In some embodiments, the query result may also indicate the approximate record counts of each group at each time slice. In some embodiments, the query result may also indicate which group results are exact values and which group results are approximate values. Additionally, in some embodiments, the query result will also include a single time series of collective group results for all groups in the aggregator ARGS 166. These collective group results may be labeled as a catch-all "others" group in the results. In some embodiments, the query result may include the approximate counts of the "others" group for each time slice. In some embodiments, the query result may also indicate an approximate count of distinct groups that are included in the "others" category, for each time slice.

FIGS. 4A to 4E illustrate operational details of a time-sliced approximate data structure (TSADS) that can be used as an approximate result grouping structure of the bounded group by query system, according to some embodiments.

Figure 4A:
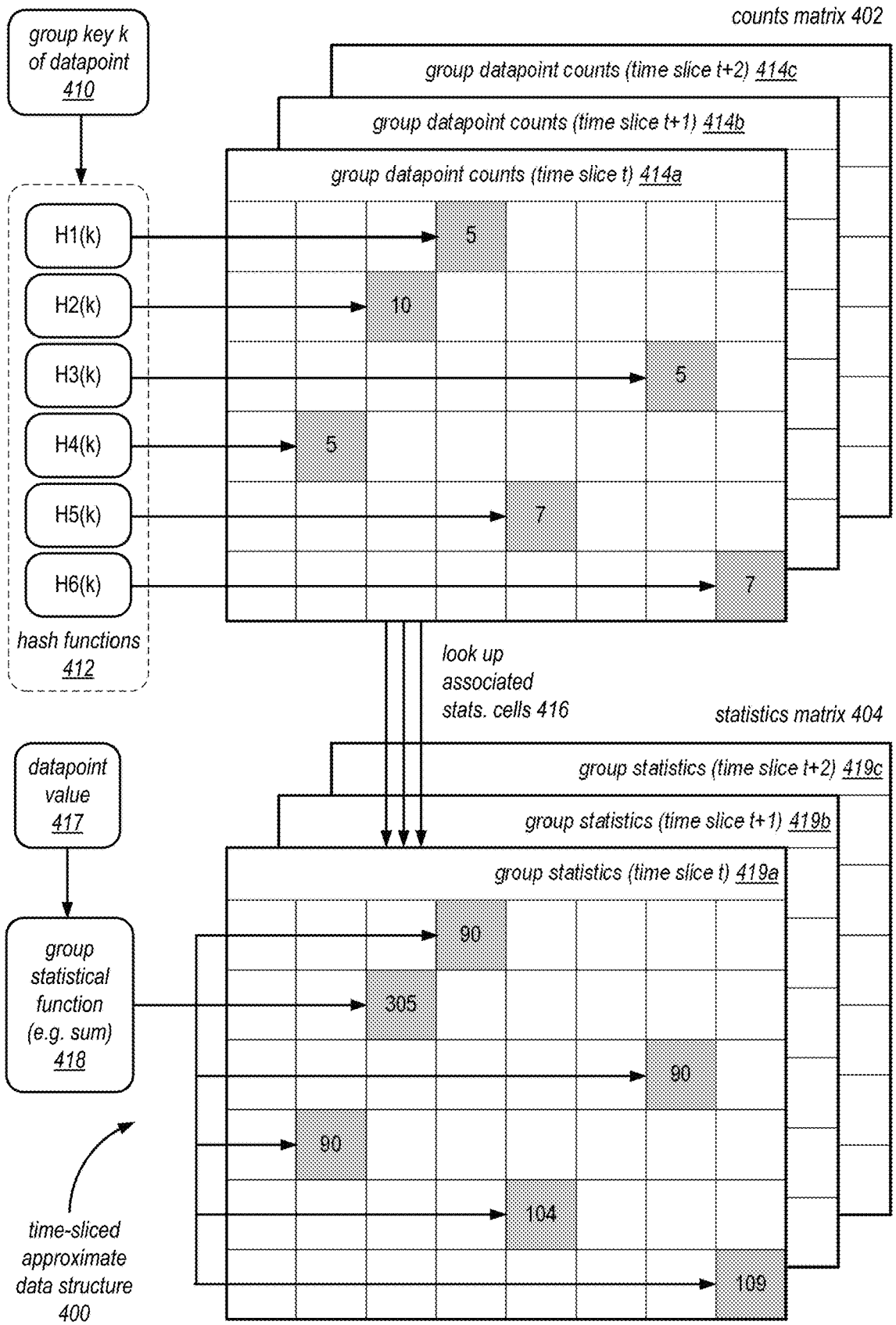
FIGS. 4A to 4E illustrate operational details of a timesliced approximate data structure (TSADS) that can be used as an approximate result grouping structure of the bounded group by query system, according to some embodiments.

FIG. 4A illustrates an embodiment of a time-sliced approximate data structure 400. As shown, the TSADS 400 is made up of two matrices, a counts matrix 402 and a statistics matrix 404. In some embodiments, the counts matrix serves as the count-min sketch 340 of FIG. 3, and the statistics matrix serves as the approximate group statistics structure 350 of FIG. 3.

The counts matrix 402 in this example is a three-dimensional matrix. Each row in the matrix is associated one in a set of hash functions 412. Each cell in the row represents a hash bucket, and the entire row represents the hash space for the hash function. Additionally, the two-dimensional table of cells 414 is provided for a plurality of time slices in a time series. Accordingly, each table of cells 414a-c stores a set of group datapoint counts for a single time slice. In some embodiments, the size of the counts matrix may be specified when the TDADS is created. In some embodiments, the TSADS may be implemented as a Java class, and the constructor of the Java class may accept input parameters that specify the dimension sizes of the counts matrix. In some embodiments, the size of the table may be automatically selected based on runtime parameters such as the size of the dataset or the time range of the query, and the number of time slices may be specified by the query.

In some embodiments, when a new datapoint is added to the TSADS 400, the group key k 410 of the datapoint is hashed by each of the hash functions in the set 412. The resulting hash values are used to select a hash bucket in each row. The determined hash bucket or cell is updated to store an approximate datapoint count of that group. As may be appreciated, because there are only a finite number of hash buckets per hash function, collisions may occur when datapoints for a large number of groups are added to the counts matrix. In the case of a count-min sketch, the minimum count for a group in the table the most likely approximate of the actual count. The count-min sketch can thus be used to store approximate counts for a large number of groups using only finite storage space.

Additionally, as shown, the datapoint value 417 of the new datapoint is added to the statistics matrix. In this example, the statistics matrix has the same dimensions as the counts matrix, and includes tables 419a-c of approximate group statistical values for each time slice. Each cell in the statistics matrix corresponds to a cell in the counts matrix.

When the new datapoint is added, the statistical matrix cells that are updated are determined based on a lookup operation 416, as shown. The updating of the statistical values in the statistical matrix cells may be performed by applying a group statistical function 418 to the datapoint value 417 of the new datapoint and the current values of the statistics matrix cells. For example, if the group statistical function is a sum function, the datapoint value 417 may be added to the current values of the statistics matrix cells. Other types of group statistical functions including minimum, maximum, average, and the like may also be used. As discussed, the group statistical function 418 is not hard-coded into the TSADS, and may be selected at runtime. It is noted that while the counts matrix and the statistics matrix as shown as two separate matrices in this example, in some embodiments, the two matrices may actually be implemented as a single matrix where each cell stores both an approximate group count and an approximate group statistical result.

Figure 4B:
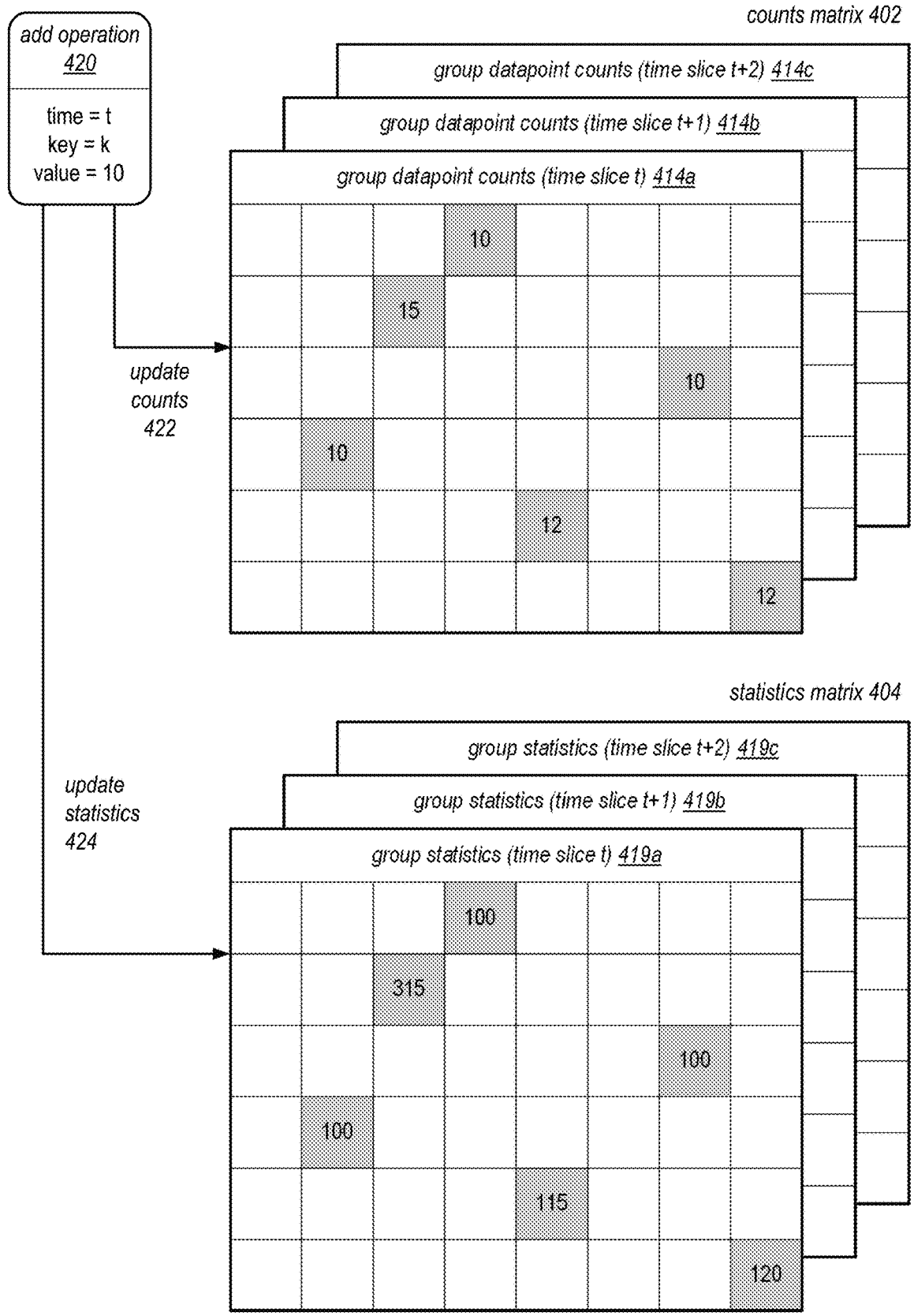

FIG. 4B illustrates an add operation 420 that adds a datapoint to the TSADS 400. As shown, the add operation specifies the time t of the data point, a group key value k of the datapoint, and a datapoint value of the datapoint. In some embodiments, another variant of the add operation may be implemented for adding compound datapoints that represent multiple individual datapoints. For example, a compound data point may represent five datapoints of the same group key and datapoint value. The compound datapoint may indicate a count of the number of individual datapoints that it represents.

As shown, the add operation first updates 422 the approximate counts of the group in the counts matrix. As discussed, the cells that are updated may be determined by hashing the group key k using the hash functions 412 of FIG. 4A. As shown, each of the values in the determined counts cells are incremented by 5 in comparison to the count values in FIG. 4A. The new values reflect the new approximates of datapoint counts for group k.

Next, a set of approximate statistical values in the statistic matrix are updated 424. As discussed, the statistics matrix cells that are updated may be determined according to the lookup operation 416 of FIG. 4A. As shown, each of the statistical values in the determined statistics matrix cells are updated to add in the value of the new datapoint.

In some embodiments, the add operation 420 may be performed in response to an add request invoked on a runtime object. For example, the add operation may be implemented as a method in a Java class, and executed when it is invoked on an instance of the class. In some embodiments, the runtime object may also implement an invocable method that adds an entire time slice of approximate counts and statistical values for many datapoints to the TSADS.

Figure 4C:
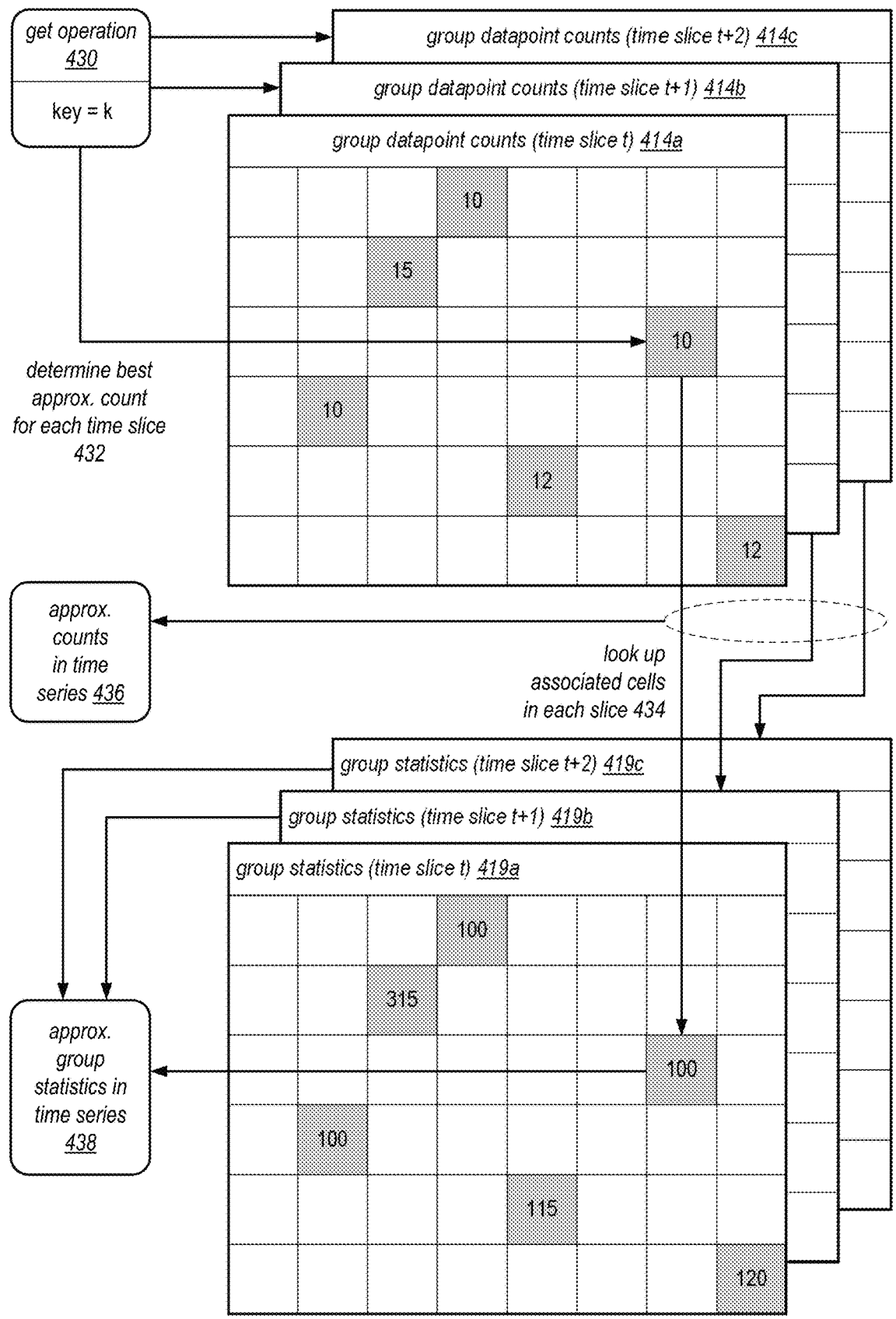

FIG. 4C illustrates a get operation 430 that retrieves a time series 436 of approximate datapoint counts for a group and a time series 438 of approximate group statistics for the group. As shown, the get operation specifies the group key k of the group to be retrieved as an input parameter.

As shown, the get operation 430 first determines 432 the best approximate count for the group k in each time slice. In the case of a count-min sketch, the best approximate count is the minimum of all approximate counts for the group (here 10) in the time slice. As shown, the best approximate counts for the group at each time slice are returned as part of the time series 436.

Next, the cell in the statistics matrix that corresponds to the cell storing the best approximate count is looked up 434. The statistical value stored in the corresponding cell (here 100) is deemed to be the best approximate group statistical result in the time slice. The best approximate group statistics for the group at each time slice are returned as part of the time series 438.

In some embodiments, the get operation may be performed in response to a get request invoked on a runtime object (e.g. a Java object) that implements the TSADS. In some embodiments, a Java class may implement a method to add a datapoint to a group in the TSADS and return resulting the approximate counts and statistics of the group via a single call.

Figure 4D:
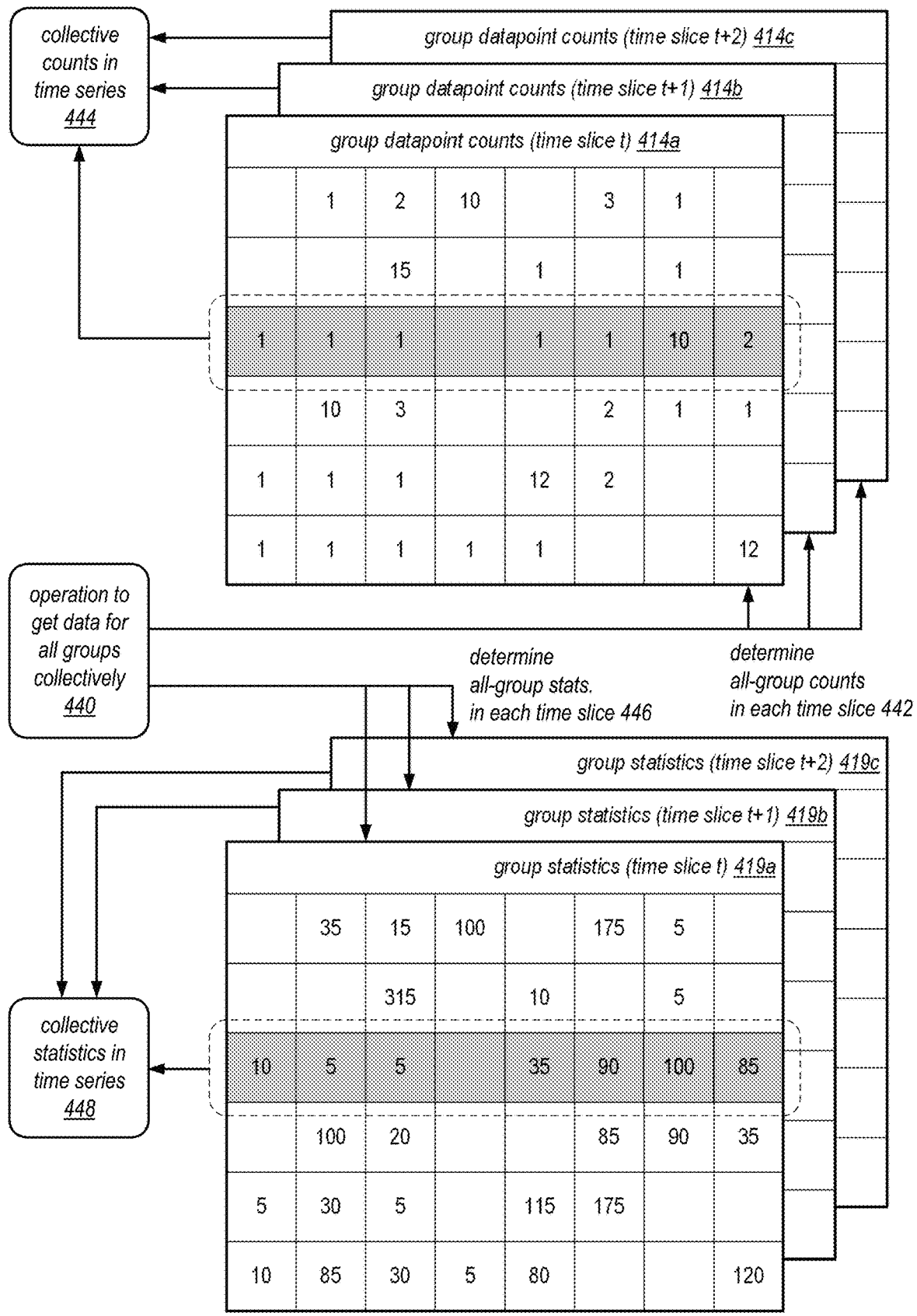

FIG. 4D illustrates another type of get operation 440 that retrieves approximate counts and statistics for all groups in the TSADS collectively. That is, the operation 440 will return a time series 444 of collective counts and a time series 448 of collective statistics for all datapoints in each time slice regardless of their groups, as if all the datapoints belonged to a single group.

As shown, operation 440 will determine 442 the collective counts for each time slice in the counts matrix. In the case of a count-min sketch, the collective count may be determined by adding the approximate counts for all hash buckets in a row. The collective count may be the same for all rows.

As shown, operation 440 will also determine 446 the collective statistics for each time slice in the statistics matrix. In the case where the statistical function is to compute the sum of datapoint values, the collective statistics for each time slice may be determined by summing all cells in a single row of the statistics matrix. Depending on the statistical function used, computation the collective statistics may also use the collective counts computed using the counts matrix.

In some embodiments, the retrieval operation 440 may be performed in response to a retrieve request invoked on a runtime object (e.g. a Java object) that implements the TSADS.

Figure 4E:
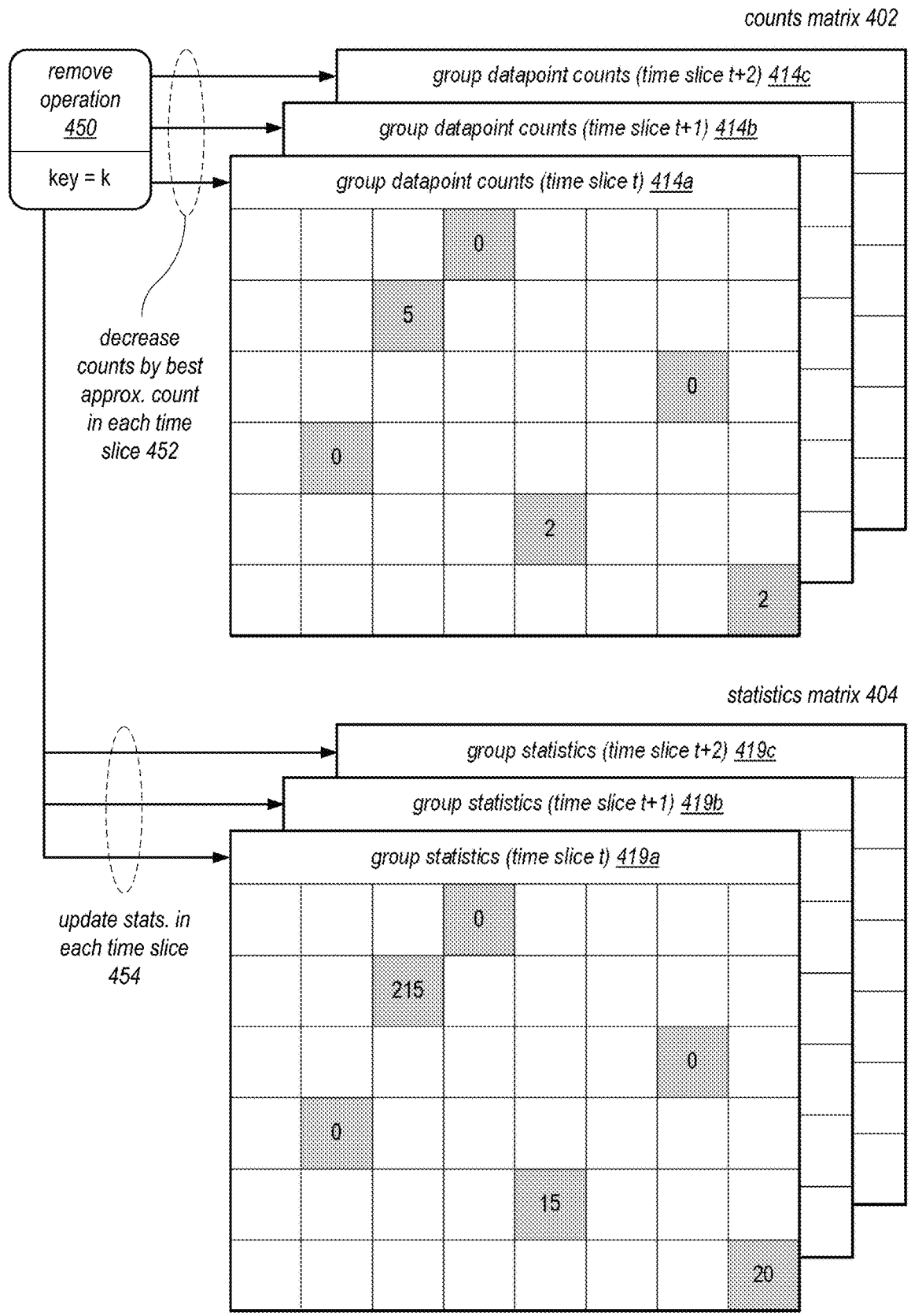

FIG. 4E illustrates a remove operation 450 that removes approximate counts and statistics for a particular group from the TSDAS. As shown, the remove operation specifies the group key k of the group to be removed as an input parameter.

As shown, the remove operation 450 decreases 452 the datapoint counts in the counts matrix by the best approximate count of the group in each time slice. The best approximate count may be determined as discussed in connection with the get operation 430 in FIG. 4C. In this example, the best approximate count for group k is 10, and all approximate counts in table 414*a* are decreased by that value. As shown, for some cells, the approximate count is reduced to zero. In some embodiments, a best approximate count of zero for a group in a time slice means that the group does not exist in that time slice.

As shown, the remove operation also updates 454 the statistical values in corresponding cells in the statistics matrix. The statistics values are updated based on the statistical function involved. For example, where the statistical function is a summation of group datapoint values, the best approximate for the group statistical value (here 100) is subtracted from each cell.

In some embodiments, the remove operation 450 may be performed in response to a remove request invoked on a runtime object (e.g. a Java object) that implements the TSADS.

Figure 5:
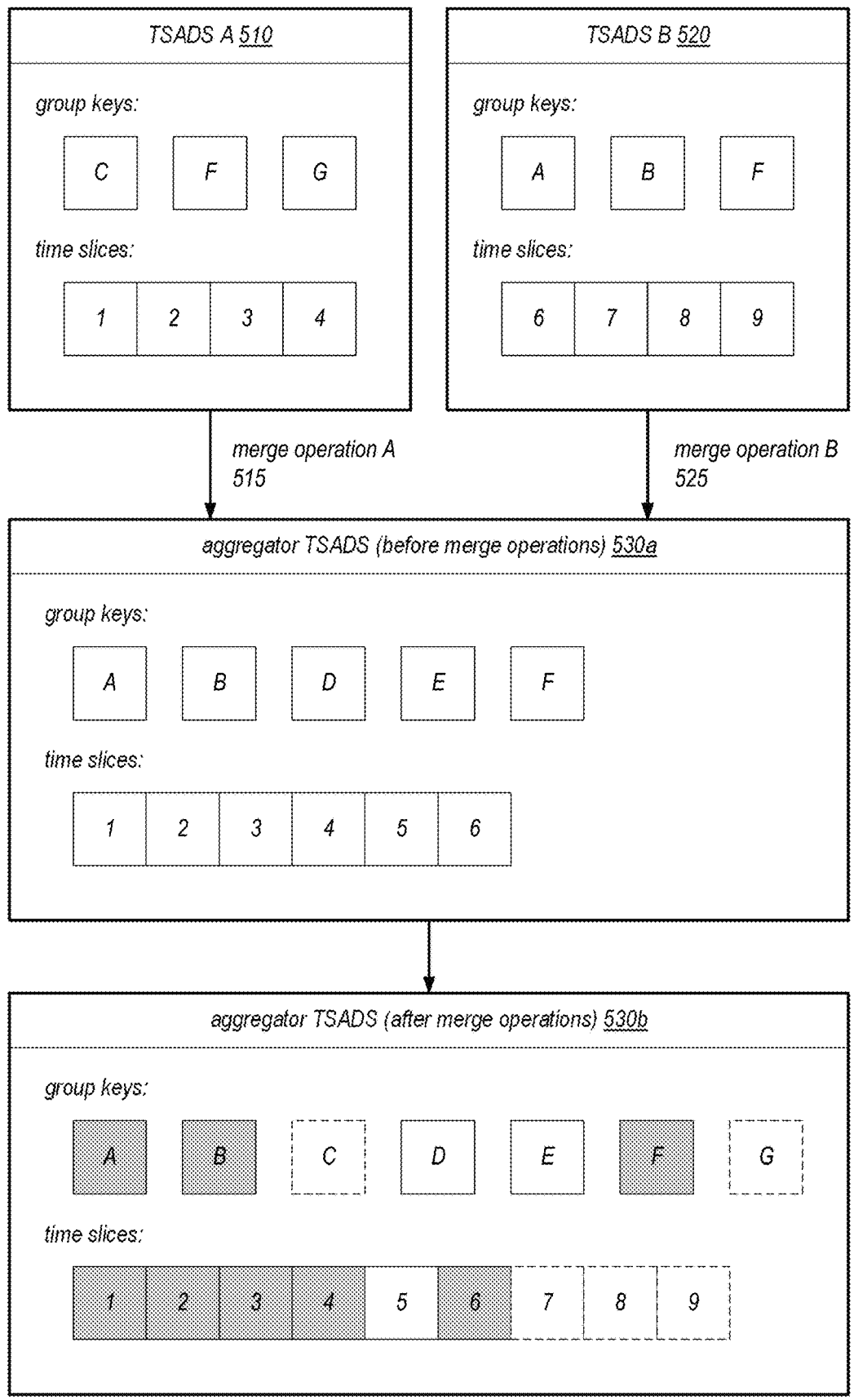
FIG. 5 illustrates two merge operations performed among TSADSs, according to some embodiments.

FIG. 5 illustrates two merge operations performed among TSADSs, according to some embodiments.

In the illustrated example, TSADS A 510 and TSADS B 520 are two accumulator ARGSs 156 generated by accumulator nodes for a portion of the queried dataset, as discussed in connection with FIG. 1. The aggregator TSADS 530 is an aggregator ARGS 166 discussed in connection with FIG. 1. As discussed, in some embodiments, the aggregator node may combine or merge many accumulator ARGSs into its own aggregator ARGS structure, and use the contents of the aggregator ARGS to generate results for the group by query.

As shown in this example, TSADS 530a represents the state of the aggregator TSADS prior to merge operation A 515 and merge operation B 525, and TSADS 530b represents the state of the aggregator TSADS after the two merge operations. As shown, prior to the two merge operations, the aggregator TSADS 530a is storing data for a set of group keys A, B, D, E, and F, and for time slices 1 to 6.

As shown, accumulator TSADS A includes two group keys (C and G) that are new to the aggregator TSADS, and one group key (F) that already exists in the TSADS. Accordingly, the merge operation 515 will cause group keys C and G to be added to the aggregator TSADS 530, and data of group key F (e.g. the approximate counts and statistics) to be merged into the data for that key in the aggregator TSADS. In some embodiments, the accumulator and aggregator TSADSs may use the same data structures (e.g. the same count-min sketch structures with the same hash functions), so the incoming TSADS can be easily merged to or combined with aggregator TSADS by combining corresponding cells in the respective structures. As shown, after the merge operation A 515, the resulting aggregator TSADS 530b includes new group keys C and G (shown in dashed boxes) and an updated group key F (shown in color).

As shown, accumulator TSADS B includes three group keys (A, B, and F) that already exist in the aggregator TSADS. However, TSADS B includes three time slices (7, 8, and 9) that are new to the aggregator TSADS. Accordingly, the merge operation 525 concatenates time slices 7, 8, and 9 to the aggregator TSADS (shown in dashed boxes for 530b). In general, new TSADSs with any new group keys or time slices can be merged into the aggregator TSADS 530 in the manner described. In some embodiments, the TSADS object may be implemented as a Java class with an invocable merge or concatenate method that allows new TSADS objects to be combined into the invoked object.

FIGS. 6A to 6E illustrate a process in which an aggregator node in a bounded group by query system merges group statistical results accumulated by an accumulator node into its aggregator result structures, according to some embodiments. In some embodiments, the depicted process may be performed by the aggregator node 162 of FIG. 1.

Figure 6A:
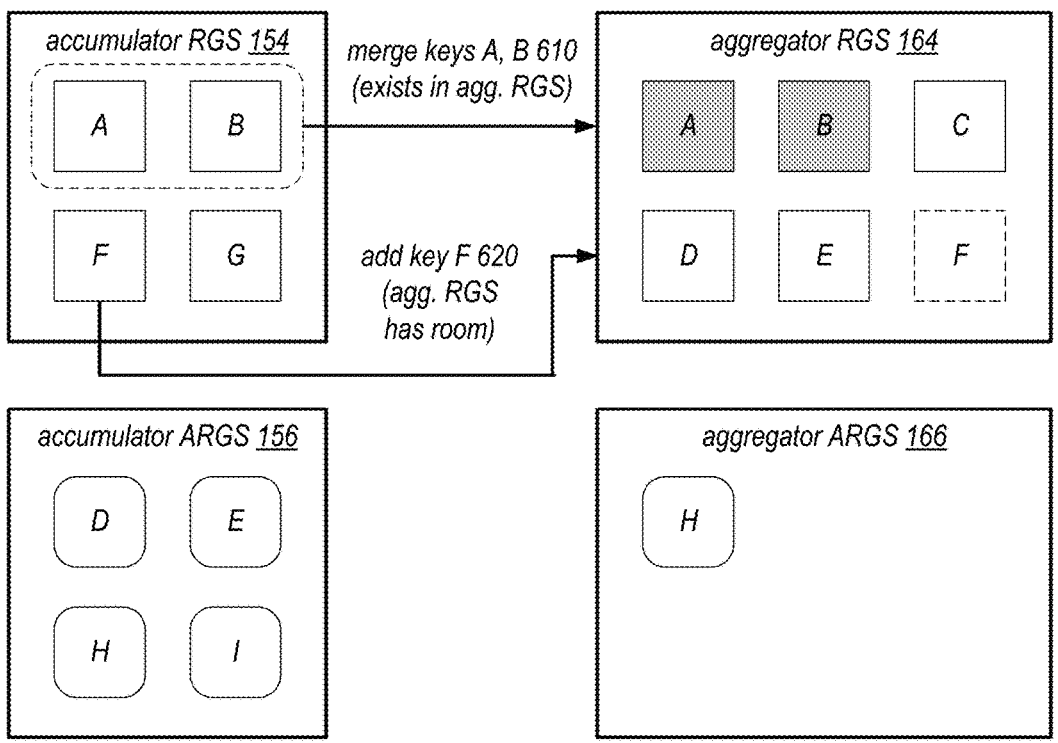
FIGS. 6A to 6E illustrate a process in which an aggregator node in a bounded group by query system merges group statistical results accumulated by an accumulator node into its aggregator result structures, according to some embodiments.

FIG. 6A shows a set of accumulator result grouping structures (the accumulator RGS 154 and accumulator ARGS 156 on the left) that will be merged into the aggregator's result grouping structures (the aggregator RGS 164 and aggregator ARGS 166 on the right). As shown, the accumulator RGS 154 stores group statistical results for four group keys A, B, F, and G, and the accumulator ARGS 156 stores group statistical results for four group keys D, E, H, and I. In this and the following figures, a group key shown in a box with rounded corners (e.g. group keys D, E, H, and I) indicates that results for the group are stored as approximates.

In FIG. 6A, the aggregator RGS 164 initially stores group keys A, B, C, D, and E. In this example, the aggregator RGS 164 is configured to hold results for a maximum of six groups. When the accumulator group result structures 154 and 156 are received, the aggregator node first attempts to merge results from the accumulator RGS 154 into its aggregator RGS 164. At operation 610, the results for keys A and B are merged into the results for these two keys already in the aggregator RGS 164. In some embodiments, the results in the accumulator RGS 154 and aggregator RGS 164 are stored respective statistical result structures 324 as discussed in connection with FIG. 3. The result of the merge operation is indicated by the colored boxes for group keys A and B in aggregator RGS 164.

At operation 620, the results of group key F are added to the aggregator RGS 164 as a new group key. The addition can be made because the aggregator RGS 164 still has room to store results for an additional group key. The new group key F is shown in a dashed box in the aggregator RGS 164. In some embodiments, operations 610 and 620 may be performed as part of a single merge operation such as merge operations 515 or 525 of FIG. 5.

Figure 6B:
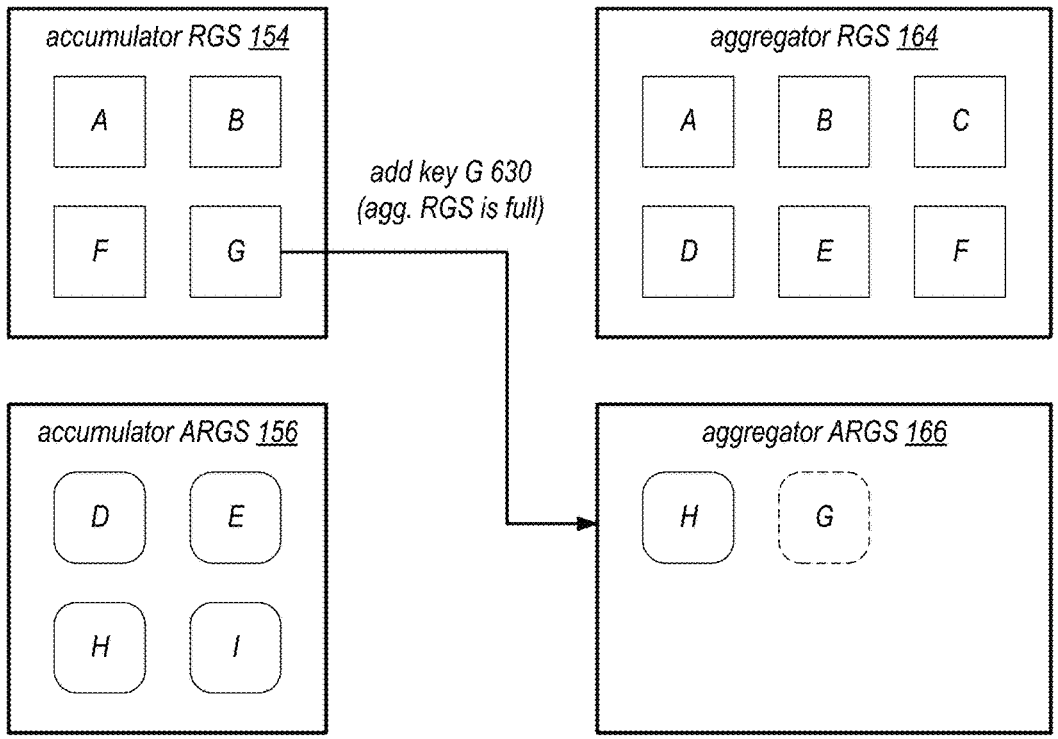

FIG. 6B shows a next operation 630 performed by the aggregator node. In operation 630, group key G in the accumulator RGS 154 is added to the aggregator ARGS 166. Group key G is added to the aggregator ARGS because it cannot be added to the aggregator RGS, which is already holding results for a maximum of groups. As a result of operation 630, group key G is shown as a new group key in the aggregator ARGS 166.

Figure 6C:
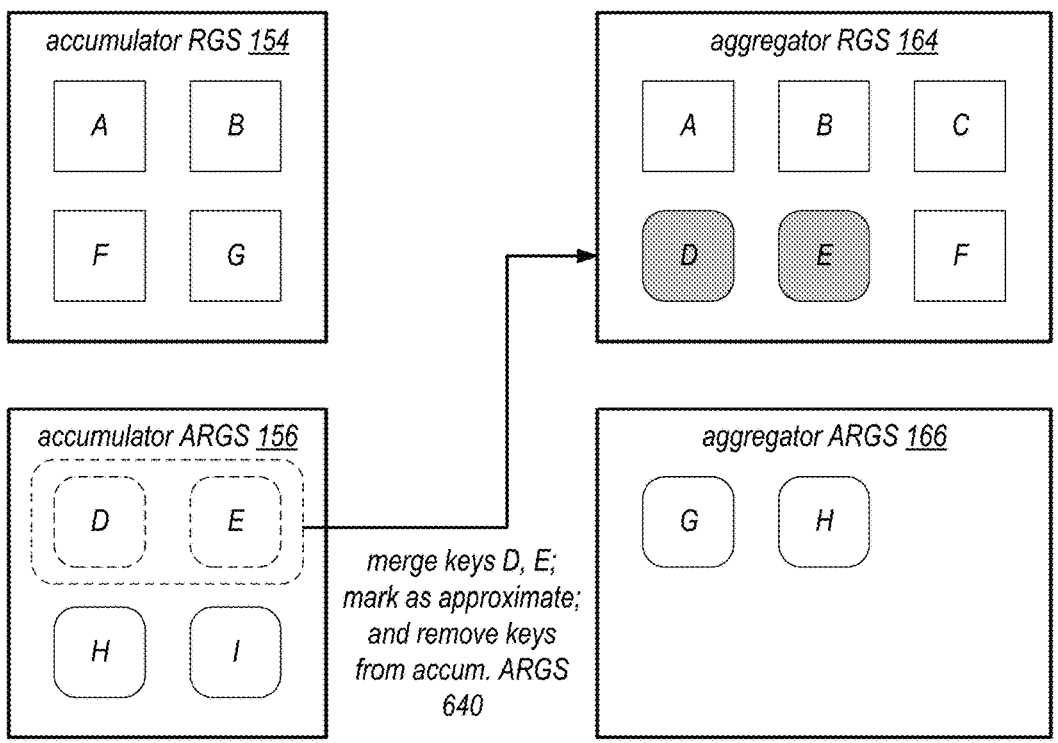

FIG. 6C shows a next operation 640 performed by the aggregator node, which merges group statistical results of group keys D and E from the accumulator ARGS 156 into results for the two keys stored in the aggregator RGS 164. The results of the merge operation 640 is shown by the colored boxes for group keys D and E in the aggregator RGS 164. Because the accumulator results for group keys D and E are approximate results, this causes the aggregated results for group keys D and E in the aggregator RGS to be marked as approximates as well. Additionally, the results for group keys D and E are removed from the accumulator ARGS 156. In some embodiments, the removal may be performed according to the remove operation 450 of FIG. 4E. Note that while this step makes the results for group keys D and E approximate, these results are still retained in the aggregator RGS 164 to provide a more complete representation of the groups in the query response. As discussed, in some embodiments, the query system will not provide individual group results for additional groups that cannot be stored in the aggregator RGS 164. Rather, the query system will report collective group results for these additional groups as a single "others" group.

Figure 6D:
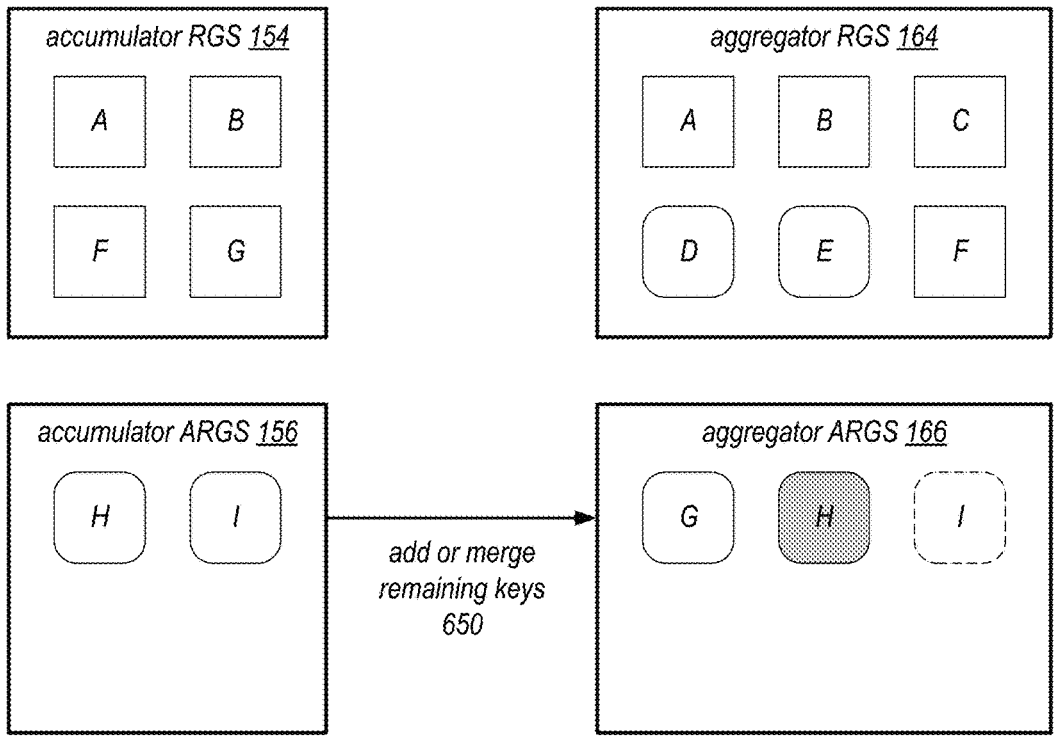

FIG. 6D shows a next operation 650 performed by the aggregator node. In operation 650, group results for all remaining group keys in the accumulator ARGS 156 are added or merged into the aggregator ARGS 166. As shown in this example, group key H is already in the aggregator ARGS 166, so the results of group key H from the accumulator ARGS are merged into the results in the aggregator ARGS. On the other hand, group key I does not already exist in the aggregator ARGS. Thus, group key I is added as a new key to the aggregator ARGS. Note that unlike the aggregator RGS, which has a capacity limit on the number groups, the aggregator ARGS can hold results for an unbounded number of groups. However, group results stored in the aggregator ARGS may only be approximates.

Table A below provides a pseudocode listing describing the process performed by the aggregator node to aggregate result grouping structures from the accumulator nodes, according to some embodiments.

TABLE A

Aggregator Node Result Aggregation Process

```
1:   FOR EACH group key k in an RGS from a worker thread
2:       threads_processed++
3:       IF k is in the aggregator RGS {
4:           UPDATE the result for k in the aggregator RGS
5:           k->from_threads_cnt++
6:       } ELSE {
7:           IF aggregator RGS is not full {
8:               SET the result for k in the aggregator RGS
9:               k->from_threads_cnt++
10:          } ELSE {
11:              UPDATE the result for k in the aggregator ARGS
12:          }
13:      }
14:  }
15:  FOR EACH group key k2 in aggregator RGS {
16:      IF k2->from_threads_count < threads_processed {
17:          count = GET count of k2 from accumulator ARGS
18:          IF count > 0 {
19:              GET results for k2 from accumulator ARGS
20:              UPDATE aggregator RGS with k2 count and results
21:              MARK k2 in the aggregator RGS as approximate
22:              CLEAR k2 from accumulator ARGS
23:          }
24:      }
25:  }
26:  MERGE all remaining keys from the accumulator ARGS into
27:      the aggregator ARGS
```

In the above pseudocode, each "work thread" represents a single accumulator node that is used to accumulate results for a portion of the queried dataset. Lines 1 to 14 describes the merging of group key results from the accumulator RGS 154 to either the aggregator RGS 164 or the aggregator ARGS 166, as discussed in connection with FIGS. 6A and 6B. As shown at line 11, if the incoming accumulator group key k is not in the aggregator RGS and the aggregator RGS is full (e.g. it is already storing results for a maximum number of group keys), the group key k will be added to the aggregator ARGS.

In the pseudocode, the values "threads_processed" and "from_threads_cnt" are used to track whether all results for a group key have been stored in the aggregator RGS. If not, in the second part of the pseudocode, a further check is performed to determine whether results for the group key is provided in the accumulator's ARGS.

The second part of the pseudocode from lines 15 to 25 describes the updating of the aggregator RGS based on approximate results for each group key k2 from the accumulator ARGS. As discussed, different accumulators may assign the same group key to their RGS or ARGS, depending on where the group key appears in their respective portions of the dataset. At line 17, an approximate count for group key k2 is determined from the accumulator ARGS. If this count is zero, it means that group key k2 is not present in the accumulator ARGS. However, if the count is non-zero, there is a possibility that the group key k2 is in the accumulator ARGS. In that case, at lines 19 to 22, a series of operations are performed to merge the results of group key k2 into the aggregator RGS, which is then marked as approximate. In some embodiments, this series of steps corresponds to the merge operation 640 discussed in connection with FIG. 6C.

Finally, at line 26, the accumulator ARGS is merged into the aggregator ARGS. This operation may correspond to operation 650 discussed in connection with FIG. 6D.

Figure 6E:
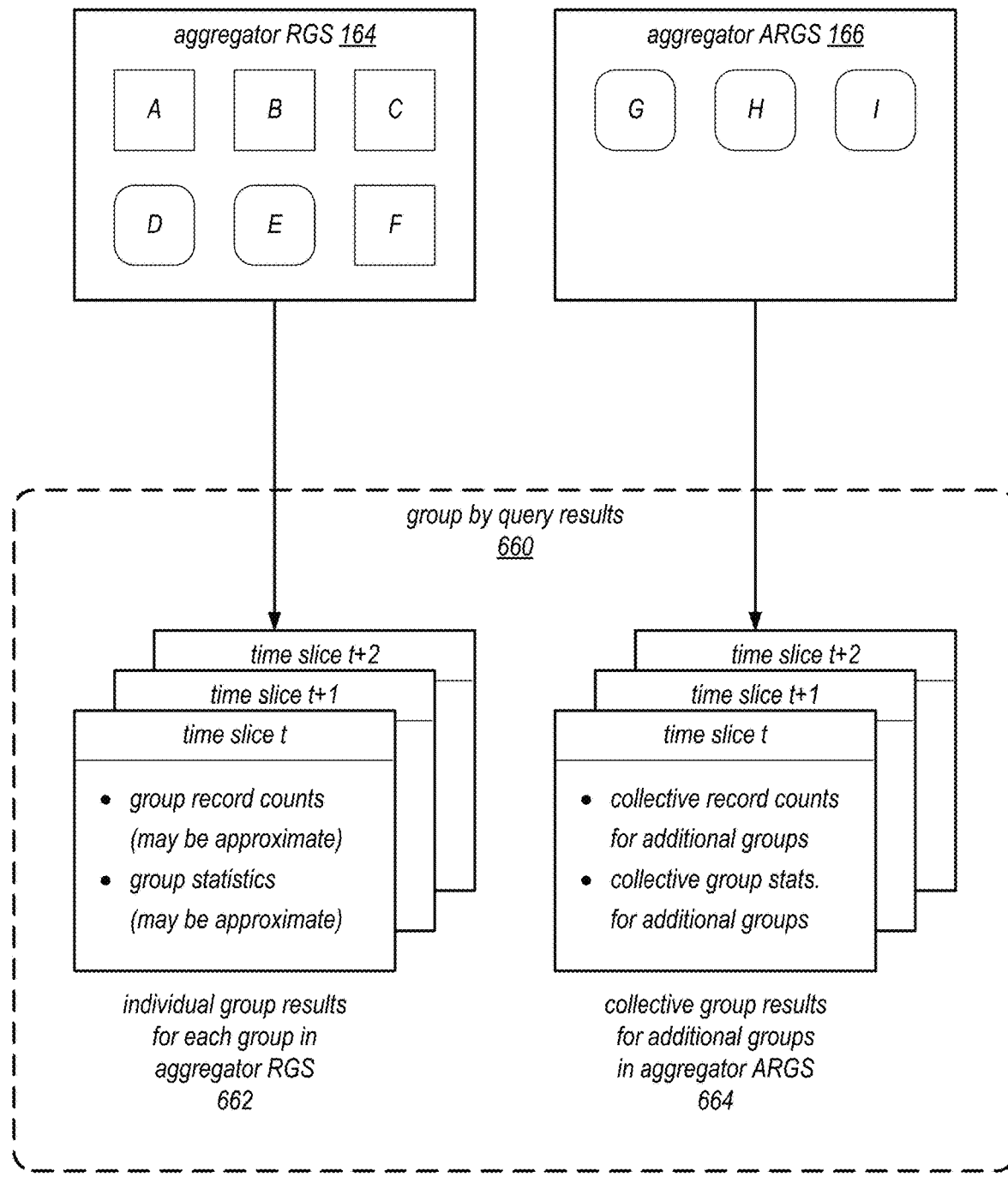

FIG. 6E shows how the aggregator RGS 164 and ARGS 166 are used to generate the ultimate query results 660 for the group by query. In some embodiments, each group key in the aggregator RGS 164 will be used to generate a time series of individual group statistical results 662 for that group. The time series will include one group statistical result for each time slice requested by the query. In some embodiments, the query results may also include a time series of group record counts for each time slice. In some embodiments, the results of each individual group in the aggregator RGS 164 is generated from the contents of respective statistical result structure 324 stored in the aggregator RGS. As discussed, some of the group statistical results stored in the aggregator RGS 164 may be approximate values. Accordingly, in some embodiments, the query results 660 may indicate which group results are approximate, and which group results are exact.

In some embodiments, all additional groups in the aggregator ARGS 166 are used to generate a time series of collective group results 664 for each time slice. The collective group results will reflect the values of all datapoints stored in the aggregator ARGS, regardless of their group, as if they all belonged to a single collective group. In some embodiments, the query results 660 may also include a time series of record counts for the collective group in each time slice. In some embodiments, the query results may also indicate an approximate number of distinct groups in the aggregator ARGS for each time slice. In some embodiments, the collective group results 664 may be retrieved from the aggregator ARGS 166 according to the retrieve operation 440 discussed in connection with FIG. 4D.

Figure 7:
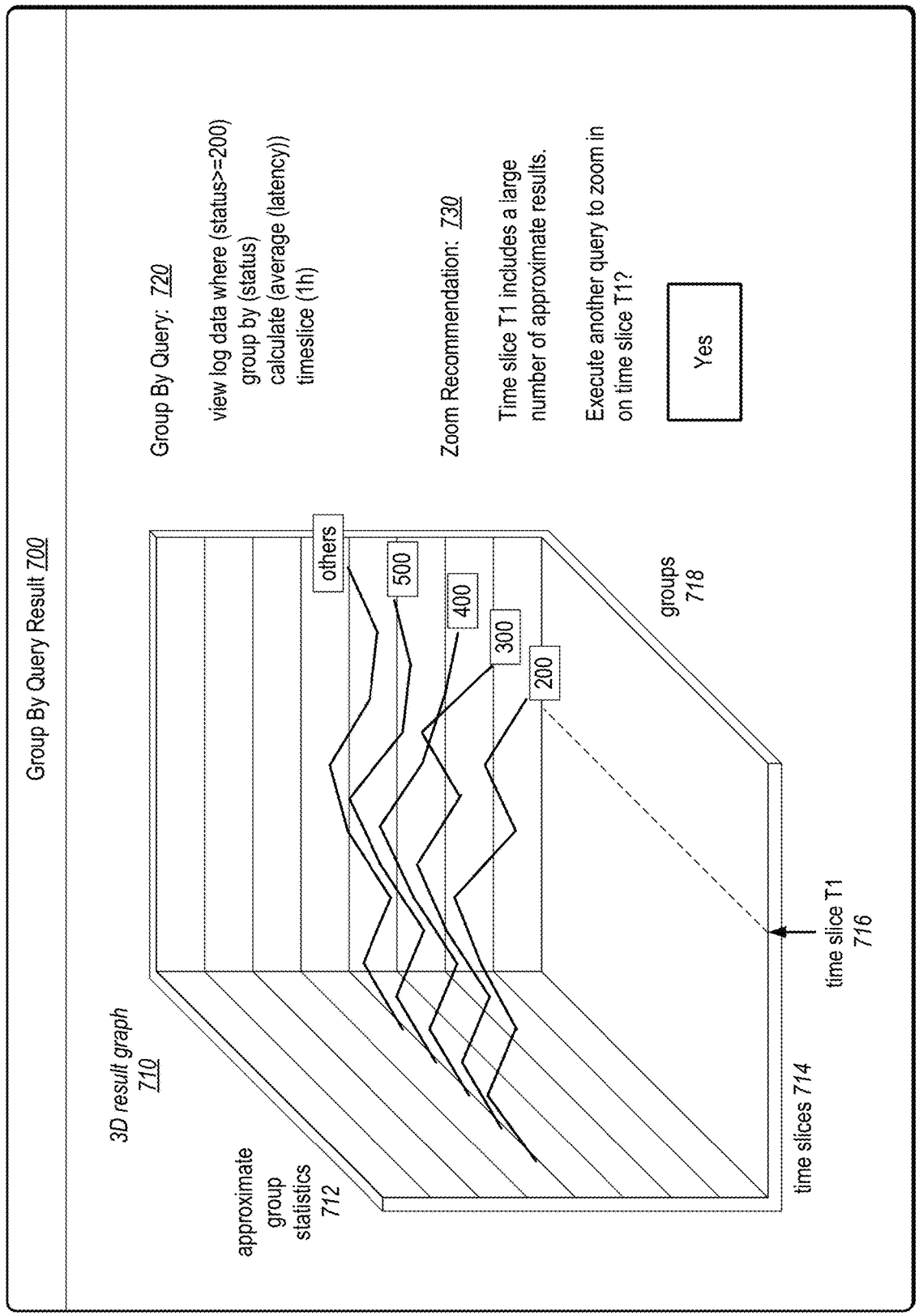
FIG. 7 depicts a graphical user interface (GUI) that provides approximate time-sliced group statistical results for a group by query, according to some embodiments.

FIG. 7 depicts a graphical user interface (GUI) that provides approximate time-sliced group statistical results for a group by query, according to some embodiments. In some embodiments, GUI 700 shown in the figure may be implemented as part of the query interface 256 of FIG. 2.

As shown, GUI 700 provides a query result for a group by query (e.g. group by query 110 of FIG. 1). In this example, the executed group by query is shown in section 720. The group by query is specified in a query language that searches a log of request records to retrieve the average latency the requests, grouped by the status code of the requests, and in one-hour time slices. In some embodiments, the query may be specified in other ways, for example, via a programmatic interface (e.g. a service interface or API), or a graphical query interface.

As shown in this example, the query results are provided in a 3D result graph 710. The 3D result graph indicates the approximate group statistical results 712 (the average latency values) on the y-axis. The time slices 714 are shown on the x-axis. The individual groups 718 are shown on the z-axis. As shown, the group results are grouped by the status codes, which are labeled with the status codes labels 200, 300, 400, 500, and "others." In some embodiments, the results for the four individual groups may be retrieved from a data structure such as the aggregator RGS 164, as discussed in connection with FIG. 1. The collective results for the "others" group may be retrieved from a data structure such as the aggregator ARGS 166 discussed in connection with FIG. 1. In this example and for illustration purposes, the query system is configured to show individual group results for only a small number (four) of groups. However, in other embodiments, the query response may indicate results for a large number of groups (e.g. hundreds or thousands) based on the maximum size of the aggregator RGS.

As discussed, depending on query execution, the results for some or all of the time slices may be approximate. In some embodiments, the 3D results graph may indicate which result values are approximate, and which are exact. In some embodiments, the GUI 700 may also show the approximate record counts of each group in each time slice. The approximate counts may be shown in another 3D graph or as an overlay in the graph 710. In some embodiments, the 3D graph may include user interactive elements that, for example, allow the user to click on a result in the graph to examine additional details about that particular result. In some embodiments, the bounded group by query system may allow the user to specify multiple group-by operations in a single query, and the 3D graph may be used to display the group results of different combinations of the groups, for example, by overlaying the results of different group combinations in a single graph or showing results for different group combinations in different graphs or views. As may be appreciated by those skilled in the art, many different types of query result display options are possible depending on the embodiment, and the display options may be configurable by the user in some embodiments.

As shown, section 730 in the GUI provides a zoom recommendation to the user. The zoom recommendation indicates that time slice T1 (shown in the graph as time slice 716) includes a large number of approximate results. Based on this determination, the query system recommends to execute another query to zoom in on time slice T1, and provides a button to perform the zooming query. In some embodiments, the zooming query may be limited to the range of time slice T1 and adjusted to increase the number of time slices or the number of individual group results. In some embodiments, instead of providing the recommendation, the query system may automatically perform the zooming query on any time slices that meet a specified zoom criterion. In some embodiments, various operational aspects of the zoom recommendation or automatic zoom query execution are configurable via a configuration interface.

FIG. 8 depicts a configuration GUI that allows users to configure the execution of group by queries in a bounded group by query system, according to some embodiments. In some embodiments, the GUI 800 may be implemented as part of the configuration interface 252 of FIG. 2.

As shown, the GUI 800 includes a section 810 for configuring result storage group limits. In this example, the GUI allows the user to specify the maximum number of exact group results to store during the accumulation phase. This first maximum number may correspond to the maximum number of groups to be stored in the accumulator RGS 154, as discussed in connection with FIGS. 1 and 3. The GUI also allows the user to specify the maximum number of individual group results to store during the aggregation phase. This second maximum number may correspond to the maximum number of groups to be stored in the aggregator RGS 164 discussed in connection with FIGS. 1 and 3. In some embodiments, the GUI may constrain the second maximum number to be greater than or equal to the first maximum number. In some embodiments, the maximum size of the accumulator or aggregator RGS may be dynamically determined by the query system based on runtime factors, such as the amount of available memory in the query system when the group by query is run. In some embodiments, the configuration GUI may allow users to specify a policy to dynamically determine the size of the accumulator or aggregator RGS based on various runtime conditions.

As shown, the GUI 800 also includes a section 820 that allows the user to configure different aspects of time slice zooming recommendations. In this example, the GUI allows the user to specify different zoom criteria to determine when a zoom should be recommended for a time slice. For example, a zoom may be recommended when a time slice includes more than some threshold number (or percentage) of approximate results. A zoom may also be recommended when the "others" group for a time slice includes more than a threshold number of distinct groups.

As shown in this example, the GUI 800 also allow the user to select the option to automatically execute a zooming query when one or more of the zoom criteria are satisfied. The GUI allows the user to configure the parameters of the zooming query, such as increasing the number of time slices, increasing the accumulation phase group limit, or increasing the aggregation phase group limit. As will be understood by those skilled in the art, depending on the embodiment, many other types of configuration parameters may be exposed to configure the execution of group by queries, in addition to the parameters shown here.

Figure 9:
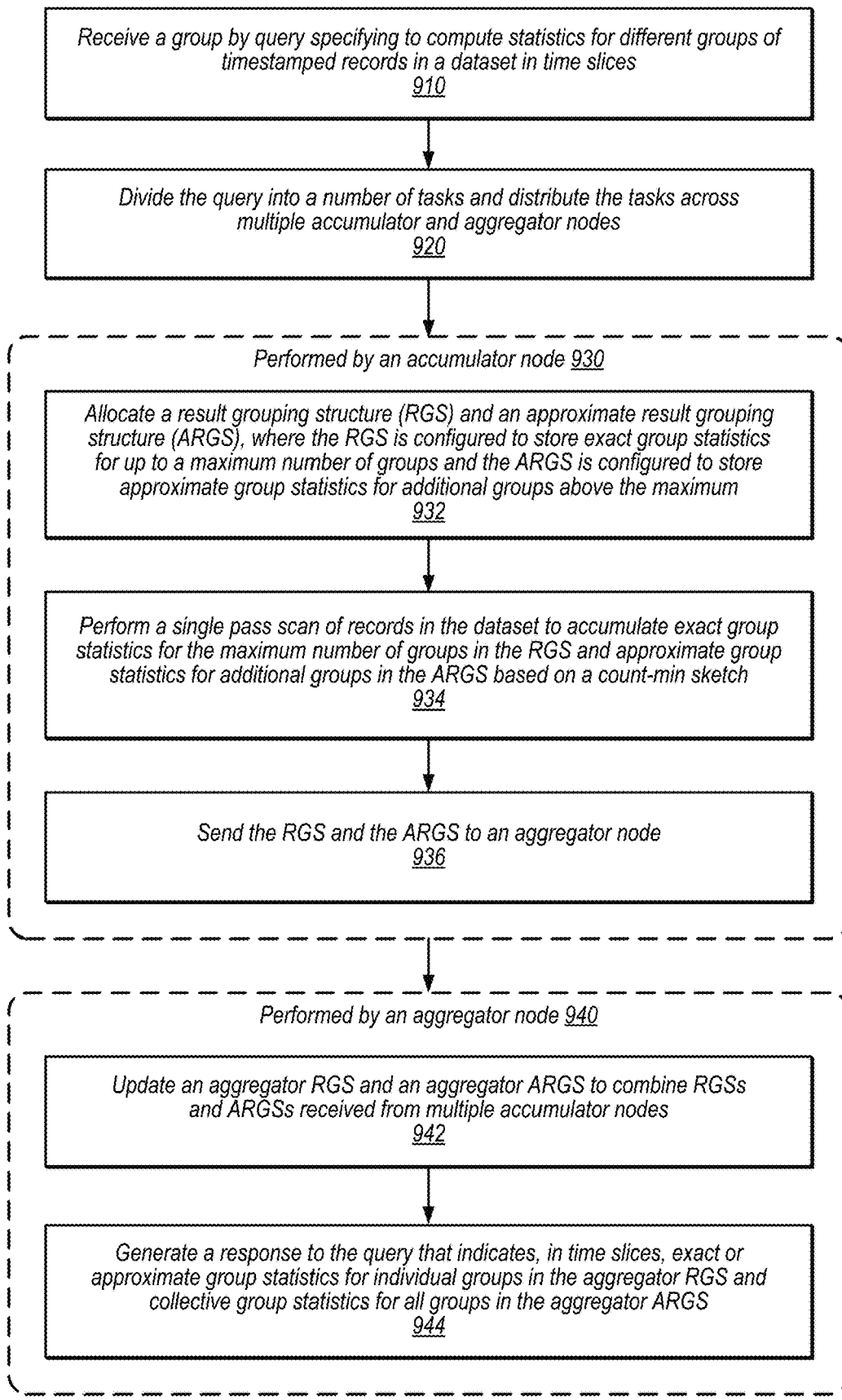
FIG. 9 is a flowchart illustrating a group by query execution process performed by a bounded group by query system, according to some embodiments.

FIG. 9 is a flowchart illustrating a group by query execution process performed by a bounded group by query system, according to some embodiments. The depicted process may be performed by an embodiment of the bounded group by query system 130 of FIG. 1.

The process begins at operation 910, where a group by query is received by the bounded group by query system. The group by query may specify to compute statistics for different groups of timestamped records in a time-based dataset, the statistics to be computed in specified time slices. In some embodiments, the group by query may be a query such as the group by query 110 of FIG. 1 or the query shown in section 720 of FIG. 7. In some embodiments, the dataset may be a log of timestamped records. The log may record machine events that were captured by a machine monitoring service for machines in various remote networks. Depending on the embodiment, the group by query may be specified in a query language, as user input received via a GUI, or a programmatic request received via a call interface.

At operation 920, the query is divided into a number of query tasks and distributed across multiple accumulator and aggregator nodes. In some embodiments, this operation may be performed by a component such as the query task distributor 140 as discussed in connection with FIG. 1. In some embodiments, the query system may maintain a pool of accumulator nodes and a pool of aggregator nodes to perform queries on datasets in a distributed fashion. The accumulator nodes may accumulate query results (e.g. group by results) for different portions of the queried dataset, and these results may be combined by one or more aggregator nodes to construct the final results of the query. Depending on the embodiment, each accumulator node and/or aggregator node may be implemented by an individual thread, process, container instance, or virtual machine instance, etc.

As shown, operations 932, 934, and 936 are performed 930 by an accumulator node (e.g. accumulator node 152a of FIG. 1). At operation 932, a result grouping structure (e.g. RGS 154) and an approximate result grouping structure (e.g. ARGS 156) are allocated. In some embodiments, these structures may be allocated in the volatile memory associated with the accumulator node, and allocated with bounded memory size so that they do not grow during the execution of the query. In some embodiments, the RGS may be a result map that maps group keys to statistical result structures for up to a maximum number of groups, as discussed in connection with FIG. 3. In some embodiments, the ARGS may be a time-sliced approximate data structure (e.g. TSADS 400) that maintains a count-min sketch of approximate record counts for groups, as discussed in connection with FIG. 4A. In some embodiments, the accumulator node uses the RGS to store exact group statistics for up to a maximum number of groups seen in the dataset, and the ARGS to store approximate group statistics for additional groups in the dataset above the maximum.

At operation 934, a single pass scan of records in the dataset is performed. The single pass scan may be performed on those records that are in the portion of the dataset assigned to the accumulator node. The single pass scan is performed in the order that the records are stored in the dataset, without first sorting the records. During the scan, the accumulator node accumulates exact group statistics for the maximum number of groups in the RGS, and approximate group statistics for some additional groups in the ARGS. In some embodiments, the exact group results may be accumulated using the statistical result structure 324 of FIG. 3. In some embodiments, the approximate group statistics may be stored using a counts matrix (e.g. a count-min sketch) and a statistical results matrix, as discussed in connection with FIG. 4A. At operation 936, the RGS and ARGS built by the accumulator node are sent to an aggregator node.

As shown, operations 942 and 944 are performed by an aggregator node (e.g. aggregator node 162 of FIG. 1). At operation 942, the aggregator node updates an aggregate RGS (e.g. aggregator RGS 164) and an aggregator ARGS (e.g. aggregator ARGS 166) to combine RGSs and ARGSs received from multiple accumulator nodes. In some embodiments, the aggregator RGS is used to hold individual group results for up to a maximum number of groups, and the aggregator ARGS is used to hold additional group results for groups above the maximum. In some embodiments, the combining of accumulator results into the aggregator result structures is performed in the process discussed in connection with FIGS. 6A to 6D.

At operation 944, a response to the query is generated by the aggregator node. The response (e.g. query response 170 of FIG. 1) will indicate, in the time slices specified by the query, exact or approximate group statistics for individual groups in the aggregator RGS and collective group statistics for all groups in the aggregator ARGS. In some embodiments, the individual group results provided in the query results may include approximate results. In some embodiments, the query results may also include approximate record counts for each group in each time slice. In some embodiments, the query results may include the various result data discussed in connection with query results 660 of FIG. 6E. In some embodiments, the query results may be returned in a graphical form, such as the graph 710 of FIG. 7.

Figure 10:
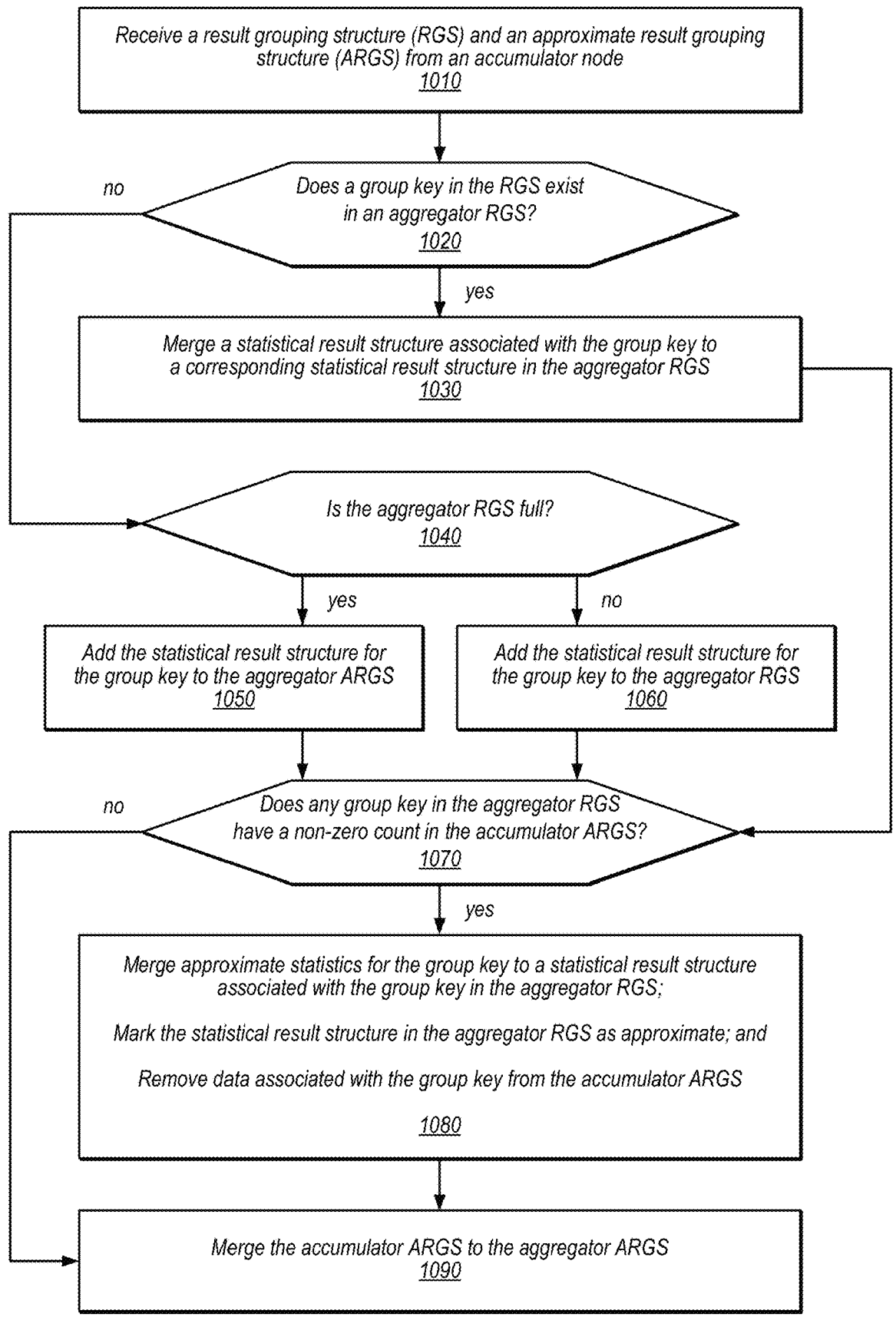
FIG. 10 is a flowchart illustrating a process performed by an aggregator node to combine query results produced by accumulator nodes in a bounded group by query system, according to some embodiments.

FIG. 10 is a flowchart illustrating a process performed by an aggregator node to combine query results produced by accumulator nodes in a bounded group by query system, according to some embodiments. The depicted process may be performed by the aggregator node 160 of FIG. 1, and in similar fashion as the process discussed in connection with FIGS. 6A to 6D.

At operation 1010, the aggregator node receives an accumulator RGS (e.g. RGS 154) and an accumulator ARGS (e.g. ARGS 156) from an accumulator node. The accumulator RGS and ARGS may be constructed by the accumulator node to store group by results for a portion of a queried dataset, as discussed in connection with FIG. 9.

At operation 1020, a determination is made whether a group key in the accumulator RGS already exists in an aggregator RGS. As discussed in connection with FIGS. 6A to 6D, the aggregator node may maintain an aggregator RGS 164 and aggregator ARGS 166. The aggregator node will combine contents of the accumulator RGS and accumulator ARGS into its own aggregator result grouping structures and generate the ultimate query results from its aggregator result grouping structures.

If the group key in the accumulator RGS is already in the aggregator RGS, at operation 1030, a statistical result structure associated with the group key in the accumulator RGS is merged to the corresponding statistical result structure in the aggregator RGS. As discussed in connection with FIG. 3, the accumulator and aggregator RGSs may be implemented as group maps that map individual group keys to respective statistical result structures, which can be easily merged with one another.

If the group key in the accumulator RGS is not in the aggregator RGS, the process proceeds to operation 1040, where it is determined whether the aggregator RGS is full. In some embodiments, the aggregator RGS may be limited to a maximum number of groups, and once this maximum number is reached, no additional groups can be stored in the aggregator RGS. In some embodiments, this maximum number is a configurable parameter that can be configured via a configuration interface (e.g. the GUI 800 of FIG. 8).

If the aggregator RGS is not full, at operation 1060, the statistical result structure is simply added to the aggregator RGS. The results of new group keys can continue to be added to the aggregator RGS until the maximum number of groups is reached. On the other hand, if the aggregator RGS is full, at operation 1050, the aggregator node adds data in the statistical result structure for the group key to the aggregator ARGS. As discussed, the aggregator ARGS may be implemented as a size-bounded data structure that can be used to store group results for an unbounded number of groups as approximate values.

At operation 1070, another determination is made whether any group key in the aggregator RGS has a non-zero count in the accumulator ARGS. In some embodiments, operations 1070 is performed to check each current group keys in the aggregator RGS. As discussed, in some situations, one group key may be stored with an exact result in the RGS of one accumulator but with an approximate result the ARGS of another accumulator. Thus, the aggregator node may sometimes receive an accumulator ARGS that contains results for a group key that is already in the aggregator RGS. In some embodiments, a zero count from the accumulator ARGS definitively indicates that the group key is not in the accumulator ARGS, which may mean that the accumulator has an exact result for that group key in its accumulator RGS.

If a group key in the aggregator RGS has a non-zero count in the accumulator ARGS, the process proceeds to operation 1080, where the approximate statistical results of the group key in the accumulator ARGS are merged into the statistical result structure associated with the group key in the aggregator RGS. However, because the results from the accumulator ARGS is approximate, the statistical results in the aggregator RGS is also marked as approximate. Additionally, the aggregator node will remove any approximate data associated with the group key from the accumulator ARGS. This step is performed so that data about the group key will not be retained when the accumulator ARGS is merged into the aggregator ARGS in the next operation. In some embodiments, the removal step may be performed using the remove operation 450 of FIG. 4E.

Finally, at operation 1090, the accumulator ARGS, with its remaining group results, are merged into the aggregator ARGS. In some embodiments, the merge operation will perform a matrix add to add all corresponding cells in the count matrices of the two ARGSs, and combine all corresponding cells in the statistics matrices of the two ARGSs based on the group statistical function. In some embodiments, the merge operation may be performed in a manner similar to merge operations 515 and 525 in FIG. 5.

Figure 11:
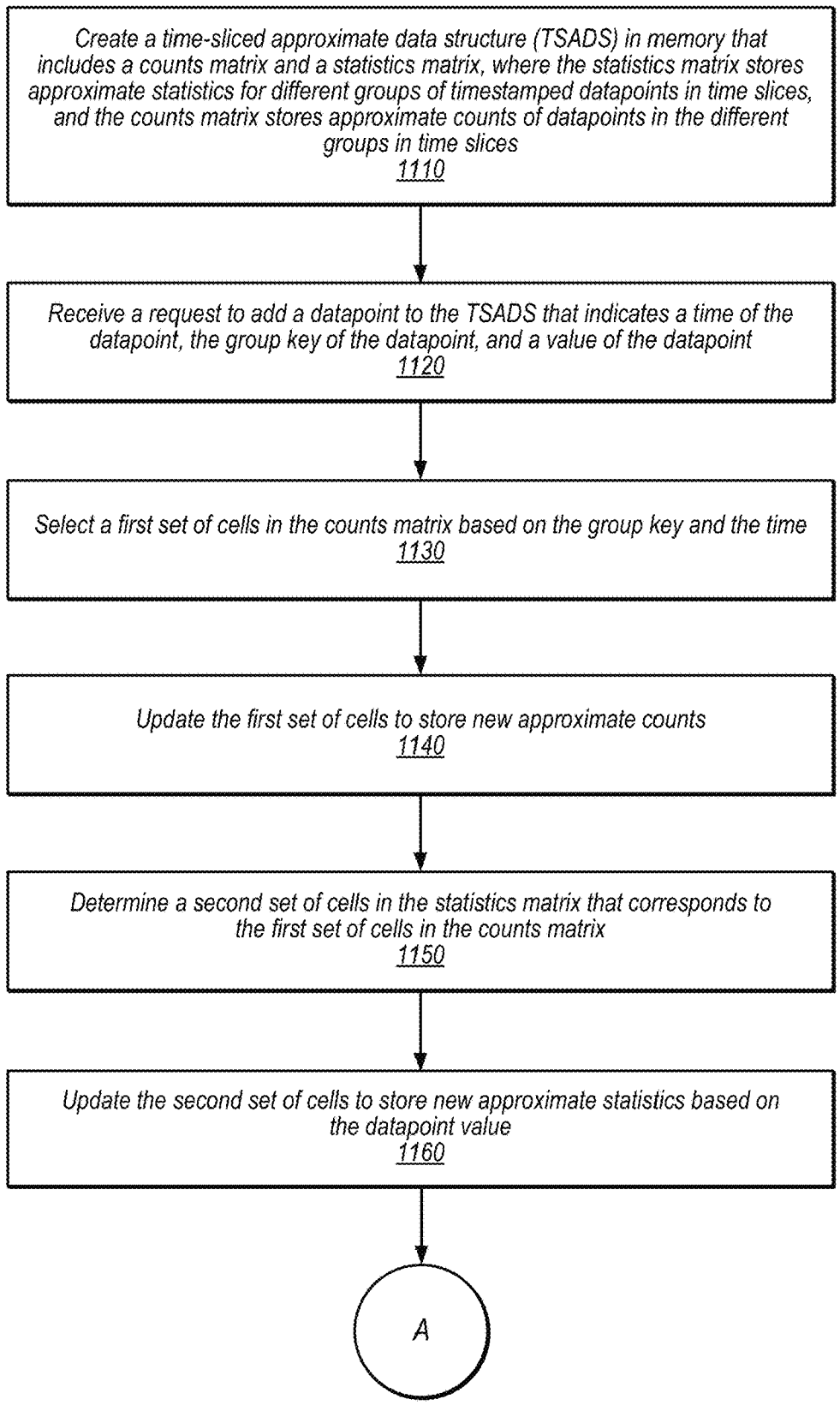
FIG. 11 is a flowchart illustrating a process of adding a datapoint to a TSADS, according to some embodiments.

FIG. 11 is a flowchart illustrating a process of adding a datapoint to a TSADS, according to some embodiments. In some embodiments, the TSADS discussed in this process may be the TSADS 400 of FIG. 4A, and the adding process may be performed by the add operation 420 of FIG. 4B.

At operation 1110, a TSADS is created in memory. The TSADS may be used by an accumulator node as the accumulator ARGS, or by an aggregator node to implement the aggregator ARGS. In some embodiments, the TSADS includes a counts matrix (e.g. counts matrix 402 of FIG. 4A) and a statistics matrix (e.g. statistics matrix 404 of FIG. 4A). The counts matrix is used to store approximate counts of datapoints in different groups in time slices, and the statistics matrix is used to approximate group statistics of the different groups in time slices. In some embodiments, the counts matrix may be implemented using a count-min sketch. In some embodiments, the two matrices may be three-dimensional matrices, and their dimensions may be specified at runtime (e.g. by input parameters to a constructor function that allocates the matrices). In some embodiments, the counts matrix and statistics matrix may be implemented as a single matrix in memory. However, in some embodiments, the two matrices are implemented as separate data structures in memory for performance reasons. For example, in some embodiments (e.g. in Java), each matrix may be implemented as an array of primitive data values that are stored in contiguous chunks of memory. This contiguous layout of the matrices provides performance benefits for a variety of matrix operations that are used by accumulator and aggregator nodes (e.g. operation 440 of FIG. 4D or merge operations 515 and 525 of FIG. 5).

At operation 1120, a request to add a datapoint to the TSADS is received. In some embodiments, the request may be received as a call to an object that implements the TSADS. For example, the TSADS may be implemented as a Java class that provides a method to add datapoints to the TSADS object. In some embodiments, the request may indicate a time of the datapoint, the group key of the datapoint, and a value of the datapoint that will be used to compute the group statistical result. In some embodiments, the datapoint may be a log record that includes the time, the group key, and the value as attributes. In some embodiments, the request may request to add a compound datapoint that represents multiple datapoints, and specify a count of the multiple datapoints represented by the compound datapoint.

At operation 1130, a first set of cells in the counts matrix is selected based on the group key and the time of the datapoint. In some embodiments, the group key is hashed using a set of hash functions (e.g. hash functions 412) to determine respective hash buckets in the hash spaces of the hash functions. These determined hash buckets (e.g. the colored cells in FIG. 4B) are the selected set of cells.

At operation 1140, the first set of cells are updated to store new approximate counts for the number of datapoints in the group. In some embodiments, the values of these cells are simply incremented. However, because the number of groups stored by the TSADS may be much larger than the hash spaces of the hash functions, collisions of multiple groups may occur in individual cells of the counts matrix. Accordingly, the counts in the cells are considered approximates.

At operation 1150, a second set of cells are determined in the statistics matrix that corresponds to the first set of cells in the counts matrix. In some embodiments, the counts matrix and the statistics matrix have the same dimensions, and so their respective cells will have a one-to-one correspondence based on their positions in the matrices. The second set of cells may be determined using a lookup step (e.g. step 416 in FIG. 4A) based on the positions of the cells in the first set.

At operation 1160, the second set of cells in the statistics matrix are updated to store approximate statistics based on the datapoint value. In some embodiments, the statistical result may be computed using a group statistical function (e.g. group statistical function 418 of FIG. 4A), which may be determined at the runtime. The current value of a cell in the statistics matrix is updated by applying a group statistical function to the incoming datapoint value and the current statistical result values in the cell. For some types of group statistical functions (e.g. a group average), the statistical result may be computed based on the approximate count of datapoints in the group.

Figure 12:
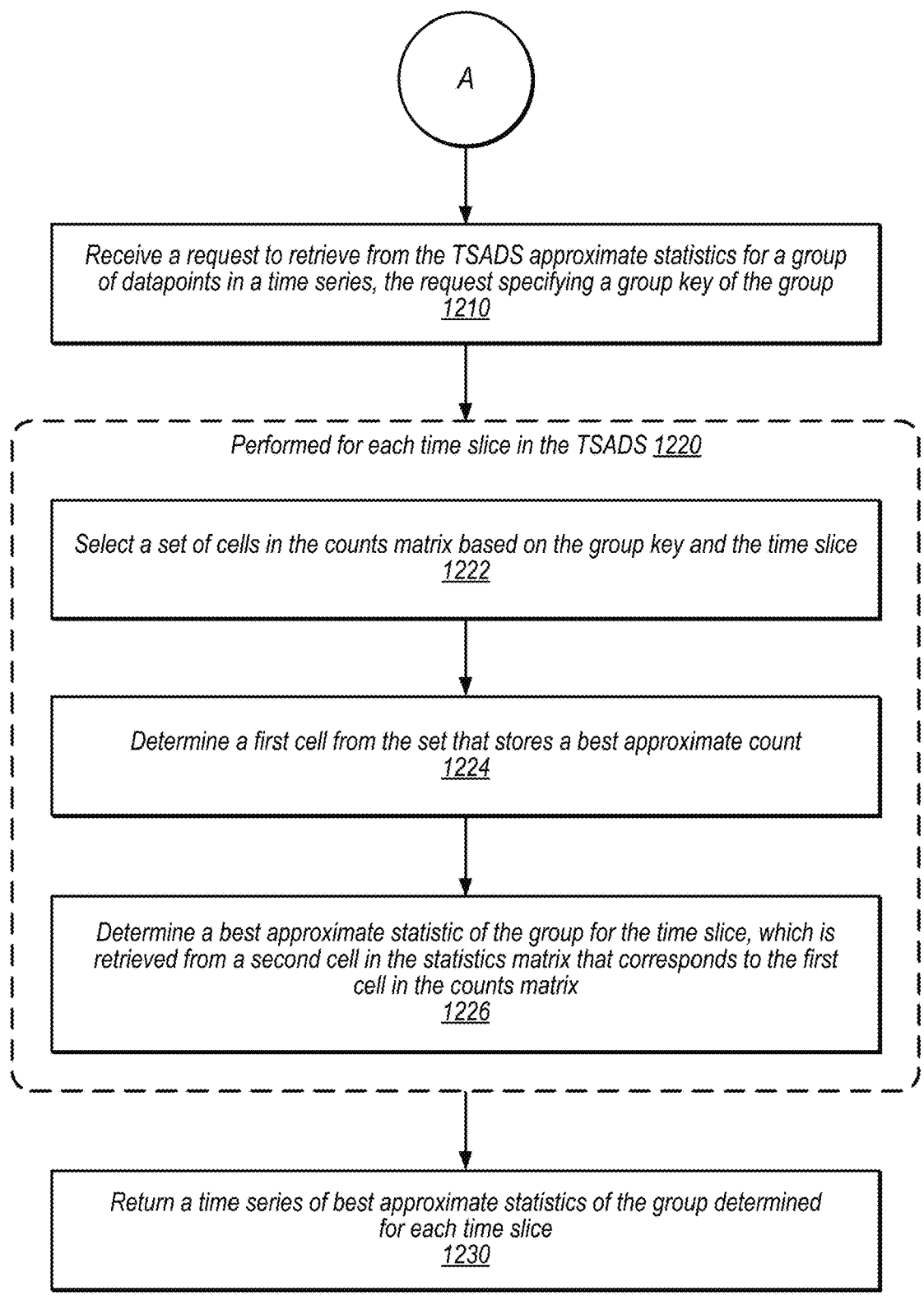
FIG. 12 is a flowchart illustrating a process of retrieving approximate group statistics for a group of datapoints in the TSADS, according to some embodiments.

FIG. 12 is a flowchart illustrating a process of retrieving approximate group statistics for a group of datapoints in the TSADS, according to some embodiments. In some embodiments, the retrieving process may be performed by the get operation 430 of FIG. 4C. As shown, the process depicted in this figure may follow from the process shown in FIG. 11.

At operation 1210, a request to retrieve approximate statistics for a group of datapoints is received for a TSADS. The retrieval request may ask to retrieve the group statistics of a group of records specified by a group key of the group, and in a time series of ordered time slices. In some embodiments, the retrieval request may be directed to an object that implements the TSADS.

As shown, operations 1222, 1224, and 1226 are performed 1220 for each time slice stored in the TSADS. At operation 1222, a set of cells in the counts matrix of the TSADS is selected based on the group key and an individual time slice. As discussed, the counts matrix may be a count-min sketch, and the set of cells may be selected by hashing the group key using the set of hash functions.

At operation 1224, a first cell is determined from the set of selected cells, where the first cell is deemed to store a best approximate count of datapoints in the group. In some embodiments, the best approximate count is the minimum count in the set of selected cells.

At operation 1226, a best approximate statistic is determined for the group and the individual time slice. The best approximate statistic may be a value stored in statistics matrix of the TSADS, at a cell that corresponds to the cell in the counts matrix that holds the best approximate count. In some embodiments, the two corresponding cells may be in the same location in their respective matrices.

After the best approximate statistic is determined for each time slice, at operation 1230, these values are used to construct a time series (e.g. an array) of statistical results for the group. The time series is then returned as the response for the retrieval request. As discussed in connection with FIG. 4C, in some embodiments, the response may also include a time series of the best approximate datapoint counts for the group.

Figure 13:
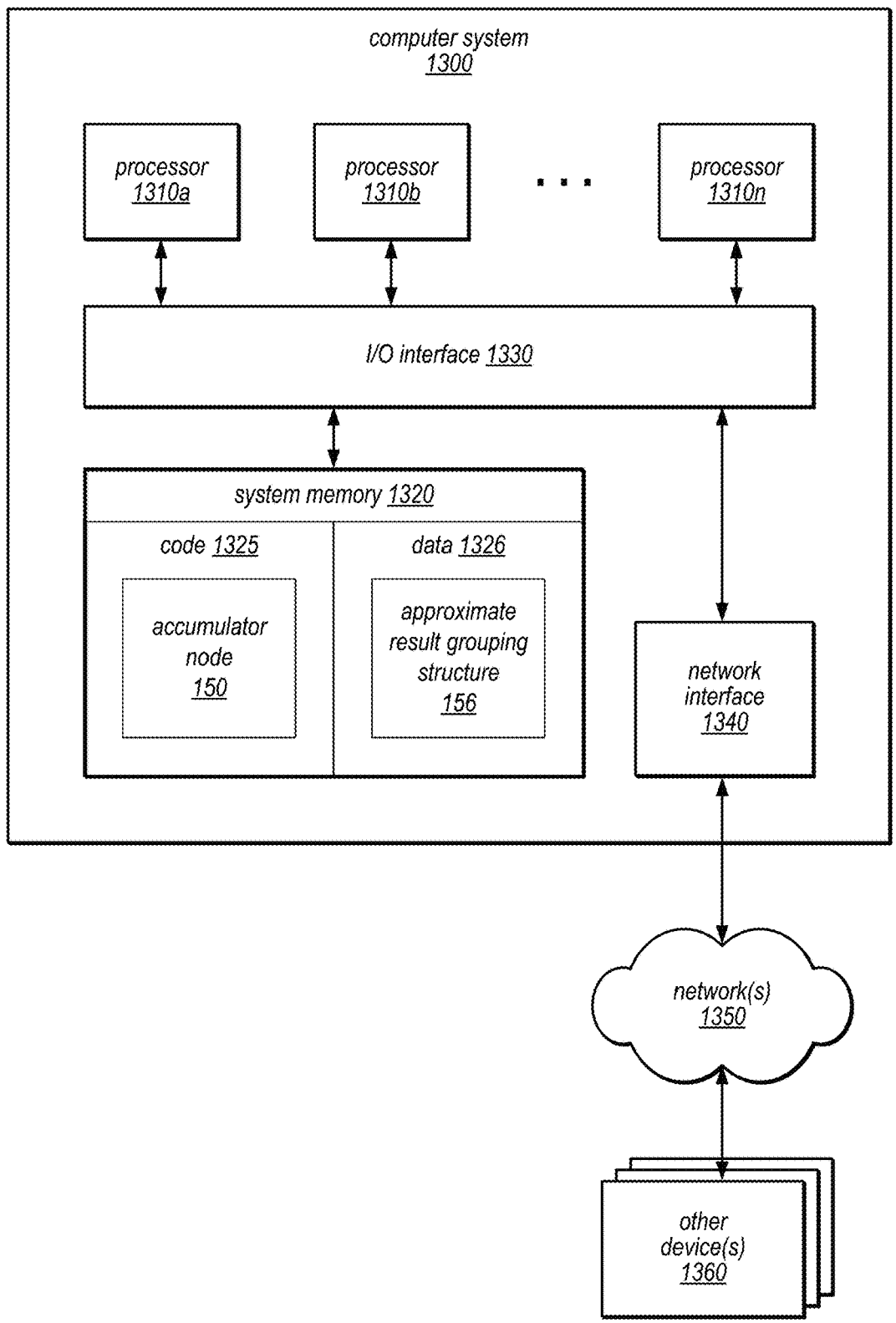
FIG. 13 is a block diagram illustrating an example computer system that can be used to implement one or more portions of a bounded group by query system, according to some embodiments.

FIG. 13 is a block diagram illustrating an example computer system that can be used to implement one or more portions of a bounded group by query system, according to some embodiments. For example, the computer system 1300 may be a server that implements one or more components of the bounded group by query system 130 of FIG. 1.

Computer system 1300 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 1300 includes one or more processors 1310, which may include multiple cores coupled to a system memory 1320 via an input/output (I/O) interface 1330. Computer system 1300 further includes a network interface 1340 coupled to I/O interface 1330. In some embodiments, computer system 1300 may be a uniprocessor system including one processor 1310, or a multiprocessor system including several processors 1310*a-n*, as shown. The processors 1310 may be any suitable processors capable of executing instructions. For example, in various embodiments, processors 1310 may implement one of a number of instruction set architectures (ISAs), such as the x86, PowerPC, SPARC, or MIPS ISA.

As shown, the computer system 1300 may also include one or more network communication devices (e.g., network interface 1340) for communicating with other systems and/or components over a communications network. For example, an instance of an application executing on computer system 1300 may use network interface 1340 to communicate with another server application executing on another computer system, as described herein.

As shown, computer system 1300 may use its network interface 1340 to communicate with one or more other devices 1360, such as persistent storage devices and/or one or more I/O devices. In some embodiments, these some of these other devices may be implemented locally on the computer system 1300, accessible via the I/O interface 1330. In various embodiments, persistent storage devices may include to disk drives, tape drives, solid state memory, other mass storage devices, or any other persistent storage device. The computer system 1300 may store instructions and/or data in persistent storage devices, and retrieve the stored instruction and/or data as needed.

As shown, the computer system 1300 may include one or more system memories 1320 that store instructions and data accessible by processor(s) 1310. In various embodiments, system memories 1320 may be implemented using any suitable memory technology, (e.g., one or more of cache, static random-access memory (SRAM), DRAM, RDRAM, EDO RAM, DDR RAM, synchronous dynamic RAM (SDRAM), EEPROM, non-volatile/Flash-type memory, etc.). The system memory 1320 may be used to store code 1325 or executable instructions to implement the methods and techniques described herein. For example, the executable instructions may include instructions to implement executable modules of an accumulator node 150, as discussed in connection with FIG. 1. The system memory 1320 may also be used to store data 1326 needed by the executable instructions. For example, the in-memory data 1326 may be used to store an ARGS 156, as discussed in connection with FIG. 1.

In some embodiments, some of the code 1325 or executable instructions may be persistently stored on the computer system 1300 and may have been loaded from external storage media. The persistent storage of the computer system 1300 and the external media are examples of non-transitory computer-readable storage media, which may be used to store program instructions to be executed by the computer system 1300. A non-transitory computer-readable storage medium may provide the capability to store information in a form readable by a machine (e.g., computer system 1300). Non-transitory computer-readable media may include storage media such as magnetic or optical media, disk or DVD/CD-ROM devices, archival tapes, network-attached storage systems, or other computer systems.

In some embodiments, the I/O interface 1330 may be configured to coordinate I/O traffic between processor 1310, system memory 1320 and any peripheral devices in the system, including through network interface 1340 or other peripheral interfaces. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments, some or all of the functionality of I/O interface 1330, such as an interface to system memory 1320, may be incorporated directly into processor 1310.

In some embodiments, the network interface 1340 may allow data to be exchanged between computer system 1300 and other devices attached to a network. The network interface 1340 may also allow communication between computer system 1300 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems 1300. Multiple input/output devices may be present in computer system 1300 or may be distributed on various nodes of a distributed system that includes computer system 1300. In some embodiments, similar input/output devices may be separate from computer system 1300 and may interact with one or more nodes of a distributed system that includes computer system 1300 through a wired or wireless connection, such as over network interface 1350. Network interface 1340 may commonly support one or more wireless networking protocols (e.g., Wi-Fi/IEEE 802.11, or another wireless networking standard). In some embodiments, the network interface 1340 may support communication via telecommunications/telephony networks such as analog voice networks or digital fiber communications networks, via storage area networks such as Fibre Channel SANs, or via any other suitable type of network and/or protocol.

Although the embodiments above have been described in considerable detail, numerous variations and modifications may become apparent to those skilled in the art once the disclosed inventive concepts are fully appreciated. It is intended that the following claims be interpreted to embrace all such variations and modifications, and the above description to be regarded in an illustrative rather than a restrictive sense.

What is claimed is:
1. A method comprising:
 performing, by one or more hardware processors with associated memory that implement a bounded group by query system:
  receiving a query specifying to compute statistics for different groups of timestamped records in a dataset and in a plurality of time slices;

performing the query, including:
allocating a result grouping structure (RGS) and an approximate result grouping structure (ARGS), wherein the RGS stores exact group statistics for up to a maximum number of groups from the different groups of timestamped records and the ARGS stores approximate group statistics for additional groups above the maximum number from the different groups of timestamped records;
in a single pass scan of at least a portion of the different groups of timestamped records in the dataset:
accumulating exact group statistics in the RGS for the maximum number of groups from the different groups of timestamped records; and
accumulating approximate group statistics in the ARGS for one or more additional groups above the maximum number from the different groups of timestamped records based on a count-min sketch; and
providing a response on to the query via a graphical user interface based at least in part on the RGS and the ARGS, wherein the graphical user interface includes a three-dimensional time graph that indicates, in the time slices, the exact group statistics for the maximum number of the groups and the approximate group statistics for the one or more additional groups above the maximum number; and
indicating on the graphical user interface a recommendation to zoom in on a particular time slice in the three-dimensional time graph, wherein the particular time slice is selected based on a number of approximate results in the particular time slice exceeding a configured threshold.

2. The method of claim 1, wherein:
the RGS comprises a group map that stores respective statistical result structures for respective group keys associated with individual groups; and
the ARGS comprises a time-sliced approximate data structure that stores (a) a plurality of approximate counts for individual groups using the count-min sketch and (b) a plurality of approximate statistics associated with individual ones of the approximate counts.

3. The method of claim 1, wherein:
the performance of the query is distributed across a plurality of accumulator nodes and at least one aggregator node;
the single pass scan is performed by one of the accumulator nodes on an assigned portion of records in the dataset; and
the method further comprises:
sending, by the accumulator node, the RGS and the ARGS to the aggregator node;
updating, by the aggregator node, an aggregator RGS and an aggregator ARGS to combine a plurality of RGSs and ARGSs received from the plurality of accumulator nodes; and
generating, by the aggregator node, the response to the query, wherein the response indicates, in the time slices, exact or approximate group statistics for individual groups in the aggregator RGS and collective group statistics for all groups in the aggregator ARGS.

4. The method of claim 3, wherein:
the updating of the aggregator RGS by the aggregator node comprises:
based on a determination that a first group key in the RGS exists in the aggregator RGS:
merging a first statistical result structure associated with the first group key in the RGS to another statistical result structure associated with the first group key in the aggregator RGS; and
based on a determination that a second group key in the aggregator RGS has a non-zero count in the ARGS:
retrieving approximate statistics associated with the second group key from the ARGS;
merging the approximate statistics retrieved from the ARGS to a second statistical result structure associated with the second group key in the aggregator RGS;
marking the second statistical result structure in the aggregator RGS as an approximate result; and
removing approximate counts and approximate statistics associated with the second group key from the ARGS; and
the updating of the aggregator ARGS by the aggregator node comprises:
based on a determination that a third group key in the RGS does not exist in the aggregator RGS and the aggregator RGS is full, adding data of a third statistical result structure associated with the third group key in the RGS to the aggregator ARGS; and
after the removing of the approximate counts and approximate statistics of the second group key from the ARGS, merging the ARGS to the aggregator ARGS.

5. The method of claim 3, wherein:
the maximum number of groups stored by the RGS is specified via a configuration interface of the bounded group by query system; and
the determination that the aggregator RGS is full is made based on a threshold specified via the configuration interface.

6. The method of claim 3, wherein providing the response to the query comprises:
providing, for each time slice, respective exact or approximate counts for the group keys in the aggregator RGS.

7. The method of claim 3, wherein providing the response to the query comprises:
providing, for each time slice, an approximate number of distinct groups included in the aggregator ARGS.

8. The method of claim 1, further comprising performing, by the bounded group by query system:
in response to user input specifying to zoom in on the particular time slice, executing another query that increases a group limit used by the query.

9. The method of claim 1, further comprising performing, by the bounded group by query system:
in response to user input specifying to zoom in on the particular time slice, executing another query that increases a number of time slices specified by the query.

10. The method of claim 1, wherein the three-dimensional time graph includes group results for a catch-all group that includes all additional groups not in the maximum number of groups.

11. The method of claim 1, further comprising performing, by the bounded group by query system:
dynamically determining the maximum number of groups stored by the RGS based on one or more runtime conditions of the bounded group by query system at a time the query is received.

12. A system, comprising:
one or more hardware processors with associated memory that implement a bounded group by query system, configured to:
receive a query specifying to compute statistics for different groups of timestamped records in a dataset and in a plurality of time slices;
perform the query, including to:
allocate a result grouping structure (RGS) and an approximate result grouping structure (ARGS), wherein the RGS is configured to store exact group statistics for up to a maximum number of groups from the different groups of timestamped records and the ARGS is configured to store approximate group statistics for additional groups above the maximum number from the different groups of timestamped records;
in a single pass scan of at least a portion of the different groups of timestamped records in the dataset:
accumulate exact group statistics in the RGS for the maximum number of groups from the different groups of timestamped records; and
accumulate approximate group statistics in the ARGS for one or more additional groups above the maximum number from the different groups of timestamped records based on a count-min sketch; and
provide a response to the query via a graphical user interface based at least in part on the RGS and the ARGS, wherein the graphical user interface includes a three-dimensional time graph that indicates, in the time slices, the exact group statistics for the maximum number of the groups and the approximate group statistics for the one or more additional groups above the maximum number; and
indicate on the graphical user interface a recommendation to zoom in on a particular time slice in the three-dimensional time graph, wherein the particular time slice is selected based on a number of approximate results in the particular time slice exceeding a configured threshold.

13. The system of claim 12, wherein:
the RGS comprises a group map configured to store respective statistical result structures for respective group keys associated with individual groups; and
the ARGS comprises a time-sliced approximate data structure configured to store (a) a plurality of approximate counts for individual groups using the count-min sketch and (b) a plurality of approximate statistics associated with individual ones of the approximate counts.

14. The system of claim 12, wherein the bounded group by query system is configured to:
distribute the performance of the query across a plurality of accumulator nodes and at least one aggregator node;
cause one of the accumulator nodes to:
perform the single pass scan on a portion of records in the dataset assigned to that accumulator node; and
send the RGS and the ARGS to the aggregator node; and
cause the aggregator node to:
update an aggregator RGS and an aggregator ARGS to combine a plurality of RGSs and ARGSs received from the plurality of accumulator nodes; and
generate the response to the query, wherein the response indicates, in the time slices, exact or approximate group statistics for individual groups in the aggregator RGS and collective group statistics for all groups in the aggregator ARGS.

15. The system of claim 14, wherein:
to update the aggregator RGS, the aggregator node is configured to:
based on a determination that a first group key in the RGS exists in the aggregator RGS:
merge a first statistical result structure associated with the first group key in the RGS to another statistical result structure associated with the first group key in the aggregator RGS; and
based on a determination that a second group key in the aggregator RGS has a non-zero count in the ARGS:
retrieve approximate statistics associated with the second group key from the ARGS;
merge the approximate statistics retrieved from the ARGS to a second statistical result structure associated with the second group key in the aggregator RGS;
mark the second statistical result structure in the aggregator RGS as an approximate result; and
remove approximate counts and approximate statistics associated with the second group key from the ARGS; and
to update the aggregator ARGS, the aggregator node is configured to:
based on a determination that a third group key in the RGS does not exist in the aggregator RGS and the aggregator RGS is full, add data of a third statistical result structure associated with the third group key in the RGS to the aggregator ARGS; and
after the removal of the approximate counts and approximate statistics of the second group key from the ARGS, merge the ARGS to the aggregator ARGS.

16. The system of claim 14, wherein to provide the response to the query, the bounded group by query system is configured to:
provide, for each time slice, respective exact or approximate counts for the group keys in the aggregator RGS.

17. The system of claim 12, wherein the recommendation is triggered based on a zoom criterion specified via a configuration interface of the bounded group by query system.

18. The system of claim 17, wherein the zoom criterion is based on a number of distinct group keys included in a catch-all group generated by the query.

19. One or more non-transitory computer-accessible storage media storing program instructions that when executed on or across one or more processors implement a bounded group by query system and cause the bounded group by query system to:
receive a query specifying to compute statistics for different groups of timestamped records in a dataset and in a plurality of time slices;
perform the query, including to:
allocate a result grouping structure (RGS) and an approximate result grouping structure (ARGS), wherein the RGS stores exact group statistics for up to a maximum number of groups from the different groups of timestamped records and the ARGS stores approximate group statistics for additional groups above the maximum number from the different groups of timestamped records;

in a single pass scan of the at least a portion of the different groups of timestamped records in the dataset:
- accumulate exact group statistics in the RGS for the maximum number of groups from the different groups of timestamped records; and
- accumulate approximate group statistics in the ARGS for one or more additional groups above the maximum number from the different groups of timestamped records based on a count-min sketch; and provide a response to the query via a graphical user interface based at least in part on the RGS and the ARGS, wherein the graphical user interface includes a three-dimensional time graph that indicates, in the time slices, the exact group statistics for the maximum number of the groups and the approximate group statistics for the one or more additional groups above the maximum number; and indicate on the graphical user interface a recommendation to zoom in on a particular time slice in the three-dimensional time graph, wherein the particular time slice is selected based on a number of approximate results in the particular time slice exceeding a configured threshold.

20. The one or more non-transitory computer-accessible storage media of claim 19, wherein the program instructions when executed on or across the one or more processors cause the bounded group by query system to:

distribute the performance of the query across a plurality of accumulator nodes and at least one aggregator node;

cause one of the accumulator nodes to:
- perform the single pass scan on a portion of records in the dataset assigned to that accumulator node; and
- send the RGS and the ARGS to the aggregator node; and cause the aggregator node to:
- update an aggregator RGS and an aggregator ARGS to combine a plurality of RGSs and ARGSs received from the plurality of accumulator nodes; and
- generate the response to the query, wherein the response indicates, in the time slices, exact or approximate group statistics for individual groups in the aggregator RGS and collective group statistics for all groups in the aggregator ARGS.

* * * * *